(12) United States Patent
Irie et al.

(10) Patent No.: US 9,275,790 B2
(45) Date of Patent: Mar. 1, 2016

(54) CONTACTLESS POWER SUPPLYING DEVICE

(71) Applicant: Panasonic Corporation, Osaka (JP)

(72) Inventors: Kenichi Irie, Osaka (JP); Satoshi Hyodo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 522 days.

(21) Appl. No.: 13/653,513

(22) Filed: Oct. 17, 2012

(65) Prior Publication Data
US 2014/0103733 A1 Apr. 17, 2014

(51) Int. Cl.
*H01F 38/14* (2006.01)
*H02J 5/00* (2006.01)

(52) U.S. Cl.
CPC ............... *H01F 38/14* (2013.01); *H02J 5/005* (2013.01)

(58) Field of Classification Search
CPC ..................................................... H01F 38/14
USPC .......................................... 307/104; 320/108
See application file for complete search history.

(56) References Cited

U.S. PATENT DOCUMENTS

| 7,893,564 | B2 | 2/2011 | Bennett |
| 2007/0139000 | A1 | 6/2007 | Kozuma et al. |
| 2009/0140691 | A1 | 6/2009 | Jung |
| 2010/0225172 | A1 | 9/2010 | Kozuma et al. |
| 2010/0270867 | A1 | 10/2010 | Abe |
| 2011/0062793 | A1* | 3/2011 | Azancot et al. ............... 307/116 |
| 2012/0235637 | A1 | 9/2012 | Tanabe |
| 2012/0274151 | A1 | 11/2012 | Kozuma et al. |
| 2013/0015705 | A1 | 1/2013 | Abe |
| 2013/0099592 | A1 | 4/2013 | Abe |

(Continued)

FOREIGN PATENT DOCUMENTS

| JP | 10-215530 | 8/1998 |
| JP | 2000-295796 A | 10/2000 |
| JP | 2006-246633 | 9/2006 |

(Continued)

OTHER PUBLICATIONS

Taiwan Office Action for corresponding Taiwanese Application No. 10320600940.

(Continued)

*Primary Examiner* — Jared Fureman
*Assistant Examiner* — James P Evans
(74) *Attorney, Agent, or Firm* — Renner, Otto, Boisselle & Sklar, LLP

(57) ABSTRACT

A contactless power supplying device is provided. A primary coil and a basic power supplying unit circuit are arranged in a power supplying area. The primary coil supplies secondary power through electromagnetic induction to a secondary coil of a power receiving device in the power supplying area. The basic power supplying unit circuit excites the primary coil in the power supplying area. The basic power supplying unit circuit transmits an oscillation signal from the power supplying area to the power receiving device, receives a modulated wave signal from the power receiving device that detects a modulation wave that is in accordance with a magnetic flux change, and detects the modulated wave signal to demodulate the modulation wave. A system control unit determines whether or not a metal foreign object is present in the power supplying area corresponding to the basic power supplying unit circuit based on the modulation wave.

9 Claims, 10 Drawing Sheets

(56) References Cited

U.S. PATENT DOCUMENTS

2013/0241288 A1 9/2013 Kozuma et al.
2013/0328411 A1 12/2013 Tanabe

FOREIGN PATENT DOCUMENTS

| JP | 2007-336717 | 12/2007 |
| JP | 2009-219177 | 9/2009 |
| TW | 201208225 | 2/2012 |
| WO | WO 2011/122348 A1 | 10/2011 |

OTHER PUBLICATIONS

Möschwitzer and Rumpf, "Einführung in die Elektronik (Introduction to Electronics)", Berlin 1978, Chapter 5.6, p. 149 and English translation.

German Office Action for corresponding German Application No. 10 2012 020 565.1 dated Jun. 28, 2013.

Japanese Office Action for corresponding Japanese Application No. 2011-168525 dated Nov. 18, 2014.

\* cited by examiner

Fig.9
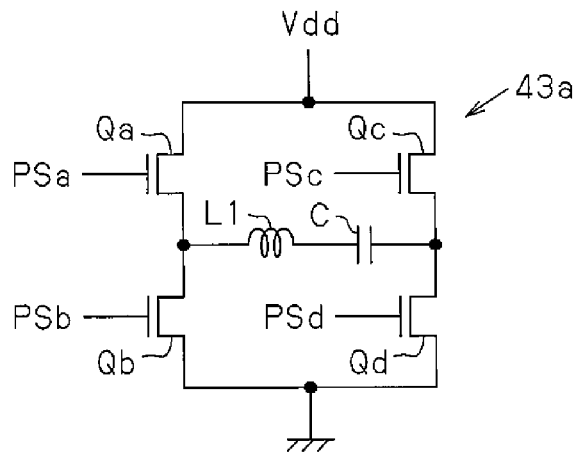
Fig.10A  φt
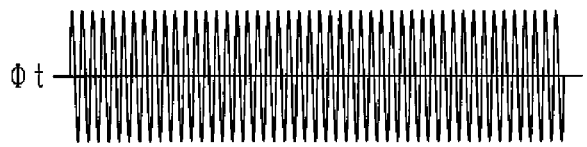
Fig.10B  MP
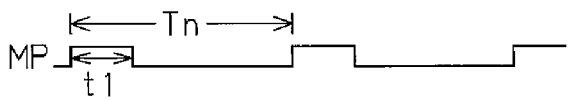
Fig.10C  φm
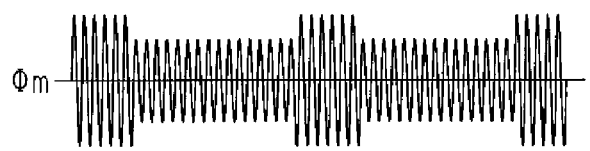
Fig.10D  DMP
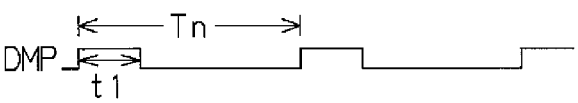
Fig.10E  φt
Fig.10F  MP
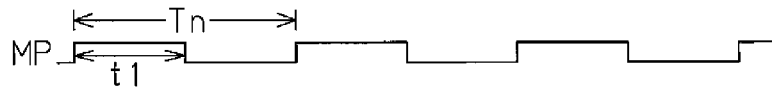
Fig.10G  φm
Fig.10H  DMP
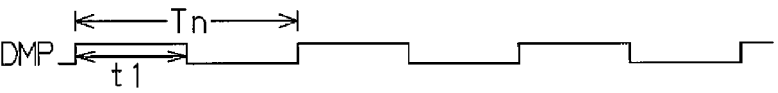

CONTACTLESS POWER SUPPLYING DEVICE

TECHNICAL FIELD

The present invention relates to a contactless power supplying device.

BACKGROUND ART

In a contactless power supplying system that performs electromagnetic induction method, an electric appliance including a power receiving device is set on a setting surface of a contactless power supplying device. In this state, the contactless power supplying device excites its primary coil thereby exciting a secondary coil arranged in the power receiving device of the electric appliance through electromagnetic induction. Secondary power is generated by the secondary coil and converted into direct current power in the power receiving device. The DC power is supplied to a load of the electric appliance as driving power.

The contactless power supplying device may include a metal detector that detects metal foreign objects and stops supplying power when the metal detector detects a metal foreign object. This prevents heating of a metal foreign object. When a metal foreign object is arranged between the contactless power supplying device and the electric appliance (power receiving device), the metal foreign object may be inductively heated when power is being supplied.

Japanese Laid-Open Patent Publication No. 2000-295796 describes an example of a metal detector arranged in a contactless power supplying device. The metal detector described in the publication excites the primary coil of the contactless power supplying device at a predetermined frequency (210 kHz), which differs from an excitation frequency (180 kHz) when supplied with power. The metal detector detects the presence of a metal foreign object when a change occurs in the inductance of the primary coil excited at the predetermined frequency and stops supplying power when a metal foreign object is present.

SUMMARY OF THE INVENTION

The metal detector detects whether or not a metal foreign object is present from a change in the inductance of a primary coil, that is, a change in the resonance frequency of an oscillation circuit including the primary coil. However, a change in the inductance of the primary coil also occurs when the positional relationship of the primary coil and the secondary coil changes. This results in a case in which it cannot be determined whether a metal object is present or whether the relative positions of the primary coil and secondary coil have changed. Accordingly, the metal detector may not accurately detect the presence of a metal foreign object unless the primary coil and the secondary coil are correctly arranged to satisfy a positional relationship that is set in advance.

Further, in the metal detector, in case a plurality of primary cores are adjacently arranged, when there is a coil that is preparing to supply power (excited at an initial frequency of 210 kHz or following frequency of 180 kHz to 210 kHz) and a coil that is supplying power (excited at 180 kHz), a differential frequency signal is generated in accordance with the frequency difference. The differential frequency signal acts as noise on the metal detector. However, the following frequency changes and thereby changes the differential frequency signal. Thus, a means for suppressing the noise becomes complicated.

One aspect of the present invention is a contactless power supplying device that uses an electromagnetic induction effect to supply power to a power receiving device arranged in an electric appliance. The contactless power supplying device includes a primary coil arranged in each of one or more power supplying areas defined in a setting surface on which the electric appliance is set. The primary coil supplies secondary power through electromagnetic induction to a secondary coil of the power receiving device in the corresponding power supplying area. Further, the contactless power supplying device includes a basic power supplying unit circuit arranged in each of the power supplying areas to excite the primary coil in the corresponding power supplying area to supply secondary power through electromagnetic induction. The basic power supplying unit circuit further transmits an oscillation signal from the corresponding power supplying area to the power receiving device, receives a modulated wave signal from the power receiving device that detects a modulation wave, which is in accordance with a magnetic flux change, from the oscillation signal, and detects the modulated wave signal to demodulate the modulation wave. The contactless power supplying device also includes a system control unit that determines whether or not a metal foreign object is present in the power supplying area corresponding to the basic power supplying unit circuit based on the modulation wave demodulated by the basic power supplying unit circuit.

In one example, the basic power supplying unit circuit includes an oscillation circuit that transmits the oscillation signal to the power receiving device, a primary detection coil that receives the modulated wave signal, a detection circuit that detects the modulated wave signal received by the primary detection coil and demodulates the modulation wave, and a duty calculation circuit that calculates a duty of the modulation wave demodulated by the detection circuit. The system control unit determines whether or not a metal foreign object is present in the power supplying area corresponding to the basic power supplying unit circuit based on the duty calculated by the duty calculation circuit and stops supplying power to the corresponding power supplying area when determining that a metal foreign object is present.

In one example, the power receiving device receives a carrier signal from the basic power supplying unit circuit with a secondary detection coil and generates the modulation wave as an ON/OFF signal having a duty that changes in accordance with a magnetic flux change at the secondary detection coil. The modulated wave signal is generated by amplitude-modulating an amplitude of the carrier signal with the ON/OFF signal. The detection circuit envelope-detects the modulated wave signal to demodulate the ON/OFF signal. The duty calculation circuit detects a duty of the ON/OFF signal demodulated by the detection circuit.

In one example, the carrier signal is the oscillation signal transmitted from the oscillation circuit to the power receiving device.

In one example, the basic power supplying unit circuit includes an oscillation circuit that transmits the oscillation signal to the power receiving device, a primary detection coil that receives the modulated wave signal, and a detection circuit that detects the modulated wave signal received by the primary detection coil and demodulates the modulation wave. The system control unit receives the modulation wave demodulated by the detection circuit, calculates a duty of the modulated wave, determines whether or not a metal foreign object is present in the power supplying area corresponding to the basic power supplying unit circuit based on the calculated duty, and stops supplying power to the corresponding power supplying area when determining that a metal foreign object is present.

In one example, the oscillation circuit is an excitation drive circuit that excites the primary coil, and the primary detection coil is the primary coil.

In one example, the basic power supplying unit circuit transmits the oscillation signal with a primary detection coil arranged independently from the primary coil, which is used to supply the secondary power to the secondary coil.

In one example, the primary detection coil is shared by adjacent ones of the power supplying areas.

In one example, the basic power supplying unit circuit transmits the oscillation signal with the primary coil that is used to supply the secondary power to the secondary coil.

Additional objects and advantages of the invention will be set forth in part in the description which follows, and in part will be obvious from the description. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

The invention, together with objects and advantages thereof, may best be understood by reference to the following description of the presently preferred embodiment together with the accompanying drawings in which:

FIG. 9 is an electric circuit diagram of a full-bridge circuit;

FIGS. 10A, 10B, 10C, and 10D are waveform charts of an oscillation signal, an ON/OFF signal, a modulated wave signal, and a demodulation signal when a metal piece is not present;

FIGS. 10E, 10F, 10G, and 10H are waveform charts of the oscillation signal, the ON/OFF signal, the modulated wave signal, and the demodulation signal when the metal piece is present;

EMBODIMENTS OF THE INVENTION

One embodiment of a contactless power supplying device according to the present invention will now be described with reference to the drawings.

Figure 1:
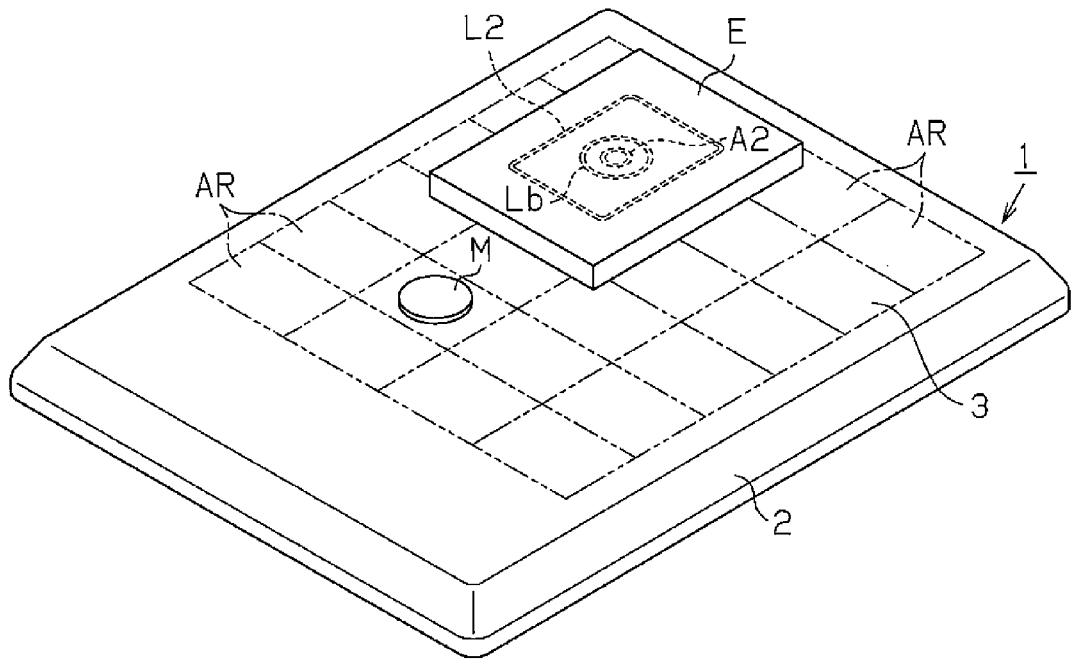
FIG. 1 is a perspective view entirely showing a contactless power supplying device and an electric appliance in a contactless power supplying system.

FIG. 1 is a perspective view entirely showing a contactless power supplying device (hereinafter simply referred to as the power supplying device) 1 and an electric appliance (hereinafter simply referred to as appliance) E, which is supplied with power from the power supplying device 1 in a contactless manner.

The power supplying device 1 includes a tetragonal plate-shaped frame 2, which has a planar upper surface that defines a setting surface 3 on which the appliance E is set. A plurality of square tetragonal supplying areas AR are defined in the setting surface 3. In the present embodiment, twenty-four power supplying areas AR, four from left to right and six from front to rear, are defined.

Figure 2:
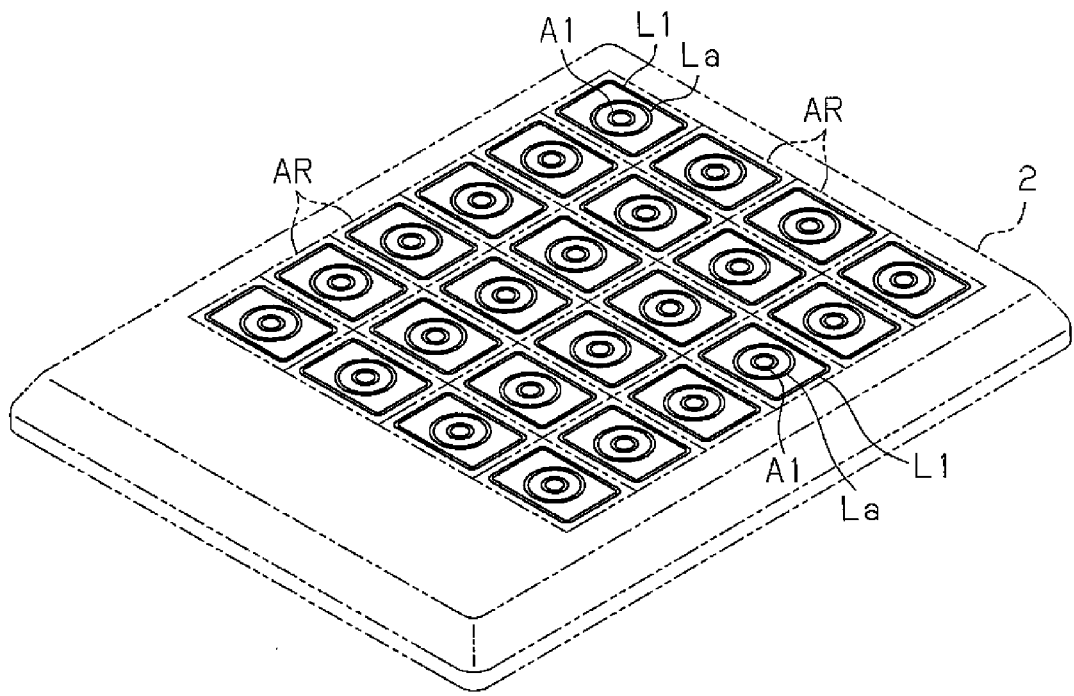
FIG. 2 is an explanatory view showing an array of primary coils.

As shown in FIG. 2, a primary coil L1 wound to have a tetragonal shape in conformance with the contour of the power supplying area AR is arranged at a position corresponding to each power supplying area AR in the frame 2. Further, a primary side metal detection coil La wound to have a circular shape (may be a tetragonal shape like the primary coil L1) is arranged in the frame 2 in correspondence with each power supplying area AR. In the present embodiment, the primary side metal detection coil La is arranged at a position above the primary coil L1 and has a smaller diameter than the primary coil L1. The primary side metal detection coil La is arranged so that its center position is aligned with a center position of the power supplying area AR. Further, a signal reception antenna coil A1 is arranged at an inner side of each primary side metal detection coil La arranged in each power supplying area AR.

In each power supplying area AR, the primary coil L1, the primary side metal detection coil La, and the signal reception antenna coil A1 are each connected to a basic power supplying unit circuit 4 (refer to FIG. 3), which is arranged in the frame 2 for each power supplying area AR.

Each primary coil L1 is excited and driven by the corresponding basic power supplying unit circuit 4. Further, each primary coil L1 is excited and driven solely or in cooperation with another primary coil L1 to supply power in a contactless manner to a secondary coil L2 in the appliance E set in the power supplying area AR.

Each primary side metal detection coil La generates an oscillation signal Φt, which is used for metal detection, when excited and driven by the corresponding basic power supplying unit circuit 4. The basic power supplying unit circuit 4 detects whether or not a metal foreign object is present on the corresponding power supplying area AR through the primary side metal detection coil La.

As shown in FIG. 1, the appliance E that receives power supply from the power supplying device 1 through electromagnetic induction includes a secondary side metal detection coil Lb arranged in the appliance E. In the present embodiment, the secondary side metal detection coil Lb is arranged at a lower side of the secondary coil L2. When the appliance E is set on the setting surface 3 of the power supplying device 1, signals used for metal detection are exchanged between the primary side metal detection coil La of the power supplying area AR located immediately below the appliance E and the secondary side metal detection coil Lb of the appliance E.

The appliance E also includes a signal transmission antenna coil A2 arranged at an inner side of the secondary side metal detection coil Lb. When the appliance is set on the setting surface 3 of the power supplying device 1, data and information and exchanged through wireless communication between the signal reception antenna coil A1 of the power supplying area AR located immediately below the appliance E and the signal transmission antenna coil A2 of the appliance E.

The electrical configuration of the power supplying device 1 and the appliance E will now be described with reference to FIG. 3.

(Appliance E)

Figure 3:
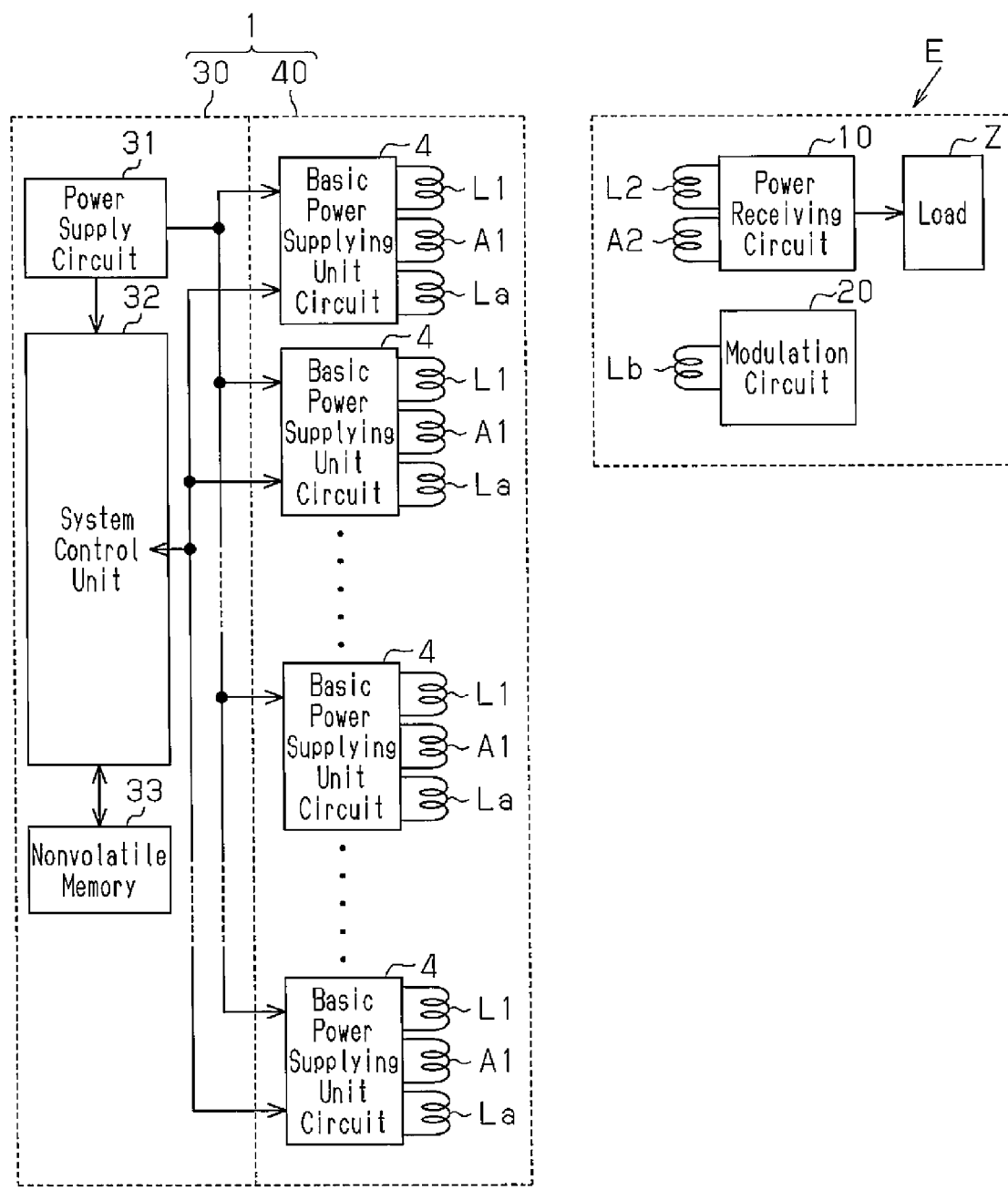
FIG. 3 is an electrical block circuit diagram of the contactless power supplying device and the electric appliance.

As shown in FIG. 3, the appliance E includes a power receiving circuit 10, which serves as a power receiving device for receiving secondary power from the power supplying device 1 in a wireless manner, and a modulation circuit 20, which modulates the oscillation signal $\phi t$ from the power supplying device 1 received by the secondary side metal detection coil Lb.

Figure 4:
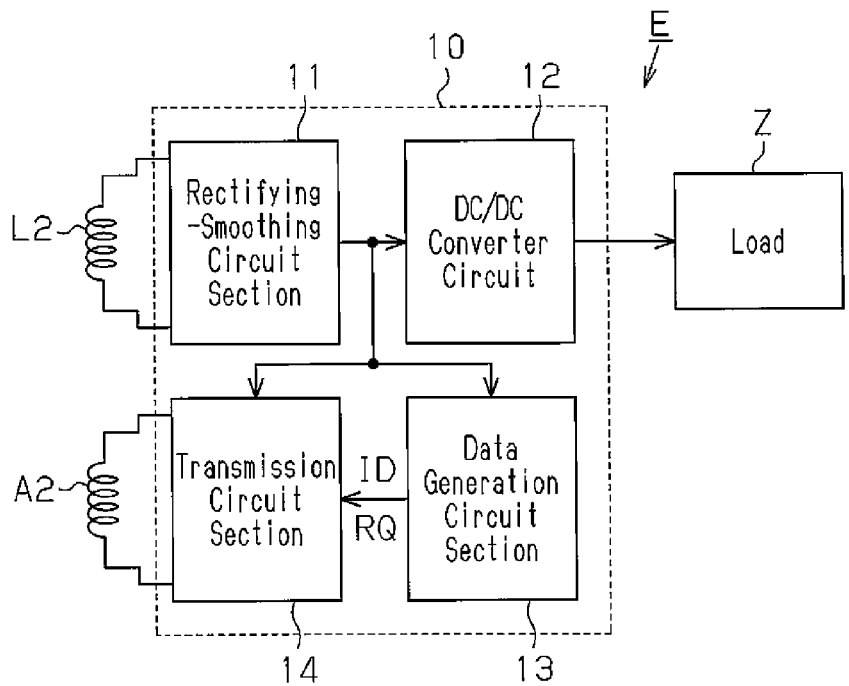
FIG. 4 is an electrical block circuit diagram of a power receiving circuit arranged in the electric appliance.

As shown in FIG. 4, the power receiving circuit 10 includes a rectifying-smoothing circuit section 11, a DC/DC converter circuit 12, a data generation circuit section 13, and a transmission circuit section 14.

The rectifying-smoothing circuit section 11 is connected to the secondary coil L2. The rectifying-smoothing circuit section 11 converts the secondary power excited and supplied to the secondary coil L2 through electromagnetic induction, which occurs when the primary coil L1 of the power supplying device 1 is excited, to DC voltage that is free from ripples. The DC/DC converter circuit 12 DC/DC-converts the DC voltage generated by the rectifying-smoothing circuit section 11 to a desired voltage. The DC/DC converted DC voltage is supplied to a load Z of the appliance E.

The load Z may be an appliance driven by the secondary power generated in the secondary coil L2. For example, the load Z may be an appliance driven on the setting surface 3 using the DC/DC-converted DC voltage as driving power. Alternatively, the load Z may be an appliance driven on the setting surface 3 directly using the secondary power as AC power. Further, the load Z may be an appliance that charges an incorporated rechargeable battery (secondary battery) using the DC/DC-converted DC power.

The DC/DC-converted DC voltage is also used as a drive source of the data generation circuit section 13 and the transmission circuit section 14.

The data generation circuit section 13 generates and provides the transmission circuit section 14 with an appliance authentication signal ID and an excitation request signal RQ. The appliance authentication signal ID indicates that the appliance E is the true appliance that can receive power from the power supplying device 1. The excitation request signal RQ is a signal for requesting the power supplying device 1 to supply power.

When the data generation circuit section 13 can be driven with the DC power supply generated by the rectifying-smoothing circuit section 11 or the secondary battery incorporated in the appliance E, for example, the data generation circuit section 13 generates the appliance authentication signal ID and the excitation request signal RQ. When a power switch that drives the load Z and is arranged in the appliance E is OFF, for example, the data generation circuit section 13 does not generate the appliance authentication signal ID and the excitation request signal RQ.

Further, when a microcomputer is arranged in the appliance E, the data generation circuit section 13 also does not generate the appliance authentication signal ID and the excitation request signal RQ when the microcomputer determines to suspend the power supply.

The transmission circuit section 14 is connected to the signal transmission antenna coil A2. The transmission circuit section 14 transmits the appliance authentication signal ID and the excitation request signal RQ from the data generation circuit section 13 to the power supplying device 1 via the signal transmission antenna coil A2.

Figure 5:
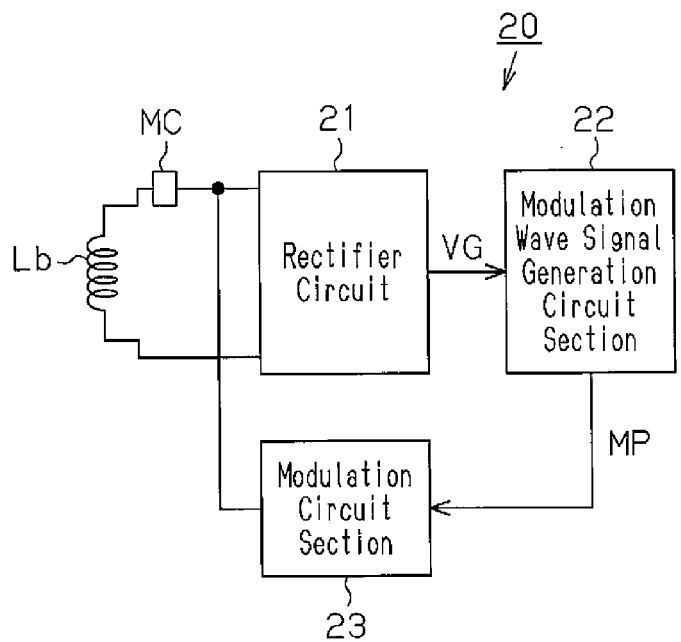
FIG. 5 is an electrical block circuit diagram of a modulation circuit arranged in the electric appliance.

The modulation circuit 20 modulates the oscillation signal $\Phi t$ from the power supplying device 1 received by the secondary side metal detection coil Lb. As shown in FIG. 5, the modulation circuit 20 includes a matching circuit MC, a rectifier circuit 21, a modulation wave signal generation circuit section 22, and a modulation circuit section 23.

The matching circuit MC performs impedance matching so that the secondary side metal detection coil Lb has a resonance point near the frequency of the oscillation signal $\Phi t$ transmitted from the primary side metal detection coil La. In the present embodiment, the matching circuit MC is configured, for example, by a resonance capacitor Cx (refer to FIG. 6).

Figure 6:
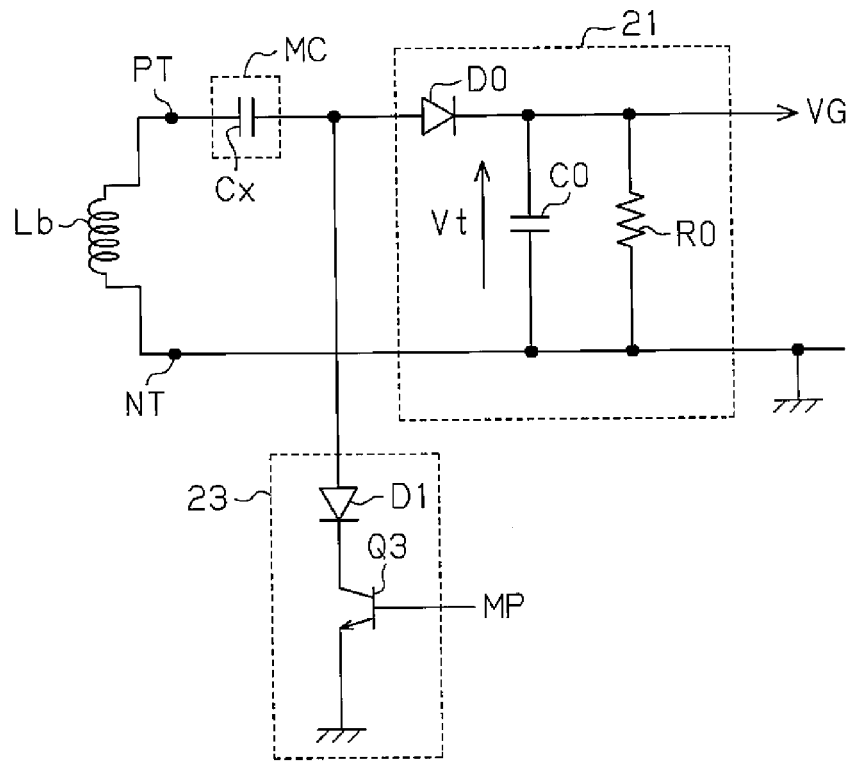
FIG. 6 is an electric circuit diagram of a rectifier circuit section and a modulation circuit section in the modulation circuit of the electric appliance.

The rectifier circuit 21 is a half-wave rectifier circuit. As shown in FIG. 6, the rectifier circuit 21 includes a rectification diode D0, a charging and discharging capacitor C0, and a resistor R0. An anode terminal of the rectification diode D0 is connected to a positive terminal PT of the secondary side metal detection coil Lb via the resonance capacitor Cx of the matching circuit MC. A cathode terminal of the rectification diode D0 is connected to a positive terminal of the charging and discharging capacitor C0. A negative terminal of the charging and discharging capacitor C0 is connected to a negative terminal NT of the secondary side metal detection coil Lb. The resistor R0 is connected in parallel to the charging and discharging capacitor C0. The rectifier circuit 21 receives the oscillation signal $\Phi t$ transmitted from the primary side metal detection coil La of the power supplying device 1 via the secondary side metal detection coil Lb. The rectifier circuit 21 half-wave-rectifies the oscillation signal $\Phi t$.

As shown in FIG. 10, in the present embodiment, the oscillation signal $\Phi t$ is a sine wave having a constant amplitude value and frequency. Accordingly, when the rectification diode D0 half-wave rectifies the oscillation signal $\Phi t$ received by the secondary side metal detection coil Lb, the charging and discharging capacitor C0 repeats charging and discharging. In other words, the charging and discharging capacitor C0 is charged with current from the rectification diode D0 when the oscillation signal $\Phi t$ has a positive electric potential. The charging and discharging capacitor C0 that is charged is discharged via the resistor R0 when the oscillation signal $\Phi t$ has a negative electric potential.

When an object (load) is present between the primary side metal detection coil La and the secondary side metal detection coil Lb, the object (load), which is spatially coupled, changes the value of the current flowing to the secondary side metal detection coil Lb.

For example, the amplitude of the oscillation signal $\Phi t$ becomes maximal, as shown in FIG. 10A, when nothing is set on the setting surface 3, that is, in an open state free from loads. Thus, the value of the current flowing to the secondary side metal detection coil Lb becomes maximal.

When a metal piece M is set on the setting surface 3, the frequency of the oscillation signal $\Phi t$ changes and the amplitude of the oscillation signal $\Phi t$ becomes minimal, for example, as shown in FIG. 10E. Thus, the value of the current flowing to the secondary side metal detection coil Lb becomes small.

In other words, a charging voltage Vt of the charging and discharging capacitor C0 takes a maximum value when nothing is set on the setting surface 3. In contrast, the charging voltage Vt of the charging and discharging capacitor C0 takes a minimum value when the metal piece M is set on the setting surface 3.

As shown in FIG. 5, the charging voltage Vt of the charging and discharging capacitor C0 is applied as a power supply voltage VG to the modulation wave signal generation circuit section 22. When the positional relationship of the primary side metal detection coil La relative to the secondary side metal detection coil Lb changes, the inductances of the primary side metal detection coil La and the secondary side metal detection coil Lb change, and the amplitude value and the frequency of the oscillation signal $\Phi$t change accordingly. In this case, compared to a change in the amplitude value and the frequency caused by displacement of the primary side metal detection coil La and the secondary side metal detection coil Lb, the amount of change in the amplitude value and the frequency is large when the metal piece M is arranged in between. Thus, a change in the oscillation signal $\Phi$t allows for a displacement between the coils La and Lb to be distinguished from a metal piece M that is present between the coils La and Lb.

Figure 7:
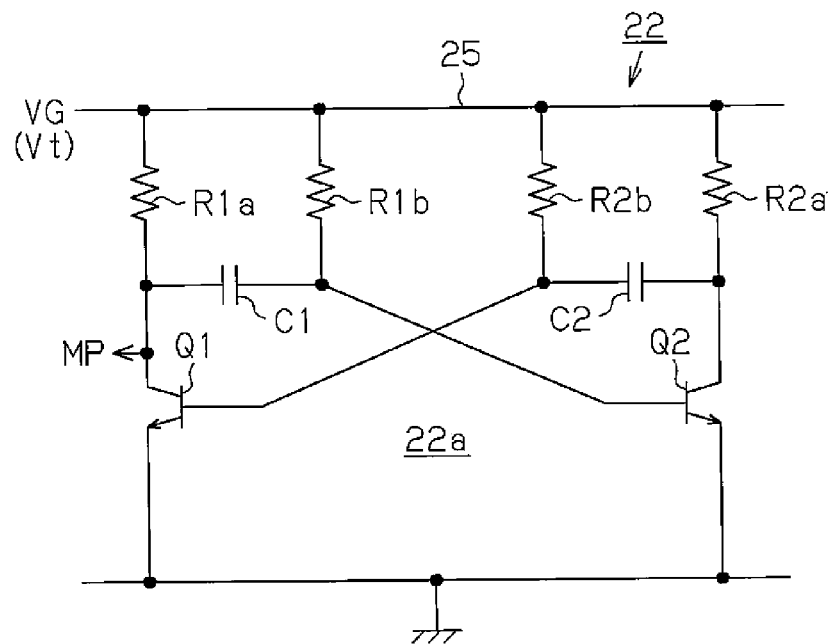
FIG. 7 is an electric circuit diagram of a modulation wave signal generating section in the modulation circuit of the electric appliance.

As shown in FIG. 7, the modulation wave signal generation circuit section 22 is formed by, for example, an astable multivibrator (hereinafter simply referred to as the multivibrator) 22a. The multivibrator 22a is a typical multivibrator configured by two transistors Q1 and Q2, two capacitors C1 and C2, and four resistors R1a, R1b, R2a, and R2b.

The multivibrator 22a is connected to a power line 25. The charging voltage Vt is applied to the power line 25 as the power supply voltage VG from the charging and discharging capacitor C0 of the rectifier circuit 21. The multivibrator 22a of the present embodiment outputs an ON/OFF signal MP (modulation wave) from a collector terminal of the transistor Q1. The ON/OFF signal MP is provided to the modulation circuit section 23.

The multivibrator 22a controls a duty DU (DU=t1/Tn) of the ON/OFF signal MP with a value of the present power supply voltage VG. This is because a change in the power supply voltage VG changes an initial value of a potential between the base and the emitter when the transistor Q1 is switched from ON to OFF, and a charging speed between the base and the emitter changes when the transistor Q2 is turned OFF.

As shown in FIG. 10B, the multivibrator 22a generates the ON/OFF signal MP so that the duty DU (DU=t1/Tn) decreases, that is, an ON time t1 is shortened relative to a cycle Tn, as the value of the power supply voltage VG increases.

In contrast, as shown in FIG. 10F, the multivibrator 22a generates the ON/OFF signal MP such that the duty DU (DU=t1/Tn) increases, that is, the ON time t1 is lengthened relative to the cycle Tn, as the value of the power supply voltage VG decreases when the metal piece M is set on the setting surface 3.

In other words, compared with when there is no metal piece M, the multivibrator 22a outputs the ON/OFF signal MP having a large duty DU from the collector terminal of the transistor Q1 when there is a metal piece M.

As shown in FIG. 5, the ON/OFF signal MP output from the collector terminal of the transistor Q1 of the multivibrator 22a is provided to the modulation circuit section 23.

As shown in FIG. 6, the modulation circuit section 23 includes a transistor Q3 and a diode D1. The diode D1 has an anode terminal, which is connected to the anode terminal of the rectification diode D0 of the rectifier circuit 21 and to the resonance capacitor Cx, and a cathode terminal, which is connected to a collector terminal of the transistor Q3. A base terminal of the transistor Q3 is connected to the collector terminal of the transistor Q1 of the multivibrator 22a. An emitter terminal of the transistor Q3 is grounded.

The transistor Q3 is turned ON and OFF by the ON/OFF signal MP from the multivibrator 22a provided to the base terminal.

Accordingly, when the transistor Q3 is turned ON, some of the charging current that charges the charging and discharging capacitor C0 through the rectification diode D0 flows to the modulation circuit section 23, that is, the transistor Q3 via the diode D1. On the other hand, when the transistor Q3 is turned OFF, the charging current that charges the charging and discharging capacitor C0 via the rectification diode D0 flows to the charging and discharging capacitor C0 through the rectification diode D0 without flowing to the transistor Q3 (modulation circuit section 23).

As a result, the value of the secondary current flowing between the terminals PT and NT of the secondary side metal detection coil Lb based on the oscillation signal $\Phi$t is changed by the ON/OFF of the transistor Q3. The change in the secondary current changes the magnetic flux emitted from the secondary side metal detection coil Lb. The changed magnetic flux is propagated to the primary side metal detection coil La as electromagnetic induction. This changes the value of the primary current flowing to the primary side metal detection coil La.

Accordingly, the ON/OFF of the transistor Q3 (by the duty DU of the ON/OFF signal MP) modulates the amplitude of the current (oscillation signal $\Phi$t) flowing between the terminals PT and NT of the secondary side metal detection coil Lb and generates the modulated wave signal $\Phi$m. The modulated wave signal $\Phi$m is transmitted from the secondary side metal detection coil Lb to the primary side metal detection coil La.

In other words, the oscillation signal $\Phi$t received by the secondary side metal detection coil Lb functions as a carrier signal. In the appliance E, the charging voltage Vt, that is, the power supply voltage VG is generated based on the amplitude value of the carrier signal, and the ON/OFF signal MP of the duty DU corresponding to the value of the power supply voltage VG is generated as the modulation wave signal. The modulated wave signal $\Phi$m shown in FIGS. 10C and 10G is generated by modulating the amplitude of the carrier signal (oscillation signal $\Phi$t) with the modulation wave signal (duty controlled ON/OFF signal MP).

For example, when the metal piece M is not present in the power supplying area AR, the modulated wave signal $\Phi$m shown in FIG. 10C is generated by modulating the oscillation signal $\Phi$t with the ON/OFF signal MP shown in FIG. 10B.

When the metal piece M is present in the power supplying area AR, the modulated wave signal $\Phi$m shown in FIG. 10G is generated by modulating the oscillation signal $\Phi$t with the ON/OFF signal MP shown in FIG. 10F.

Accordingly, an envelope waveform of the modulated wave signal $\Phi$m is represented with a waveform that is relative to the duty DU of the ON/OFF signal MP (modulation wave).

(Power Supplying Device 1)

As shown in FIG. 3, the power supplying device 1 includes a common unit section 30 and a basic unit section 40.

The common unit section 30 includes a power supply circuit 31 that supplies power to the basic unit section 40, a system control unit 32 that centrally controls the basic unit section 40, and a nonvolatile memory 33 that stores various types of data.

The power supply circuit 31, which includes a rectifier circuit and a DC/DC converter (both not shown), rectifies externally supplied commercial power into DC voltage with the rectifier circuit. The power supply circuit 31 converts the DC voltage to a desired DC voltage Vdd with the DC/DC converter. The DC voltage Vdd is supplied to the system control unit 32, the nonvolatile memory 33, and the basic unit section 40 as driving power.

The system control unit 32, which includes a microcomputer, controls the basic unit section 40. The nonvolatile memory 33 stores various types of data used when the system control unit 32 performs various determination processes.

As shown in FIG. 3, the basic unit section 40 includes the basic power supplying unit circuits 4 for the power supplying area AR (primary coils L1). The basic power supplying unit circuit 4 exchanges data with the system control unit 32 under the control of the system control unit 32.

The basic power supplying unit circuits 4 have the same configuration. Thus, for the sake of brevity, one of the basic power supplying unit circuits 4 will be described with reference to FIG. 8.

Figure 8:
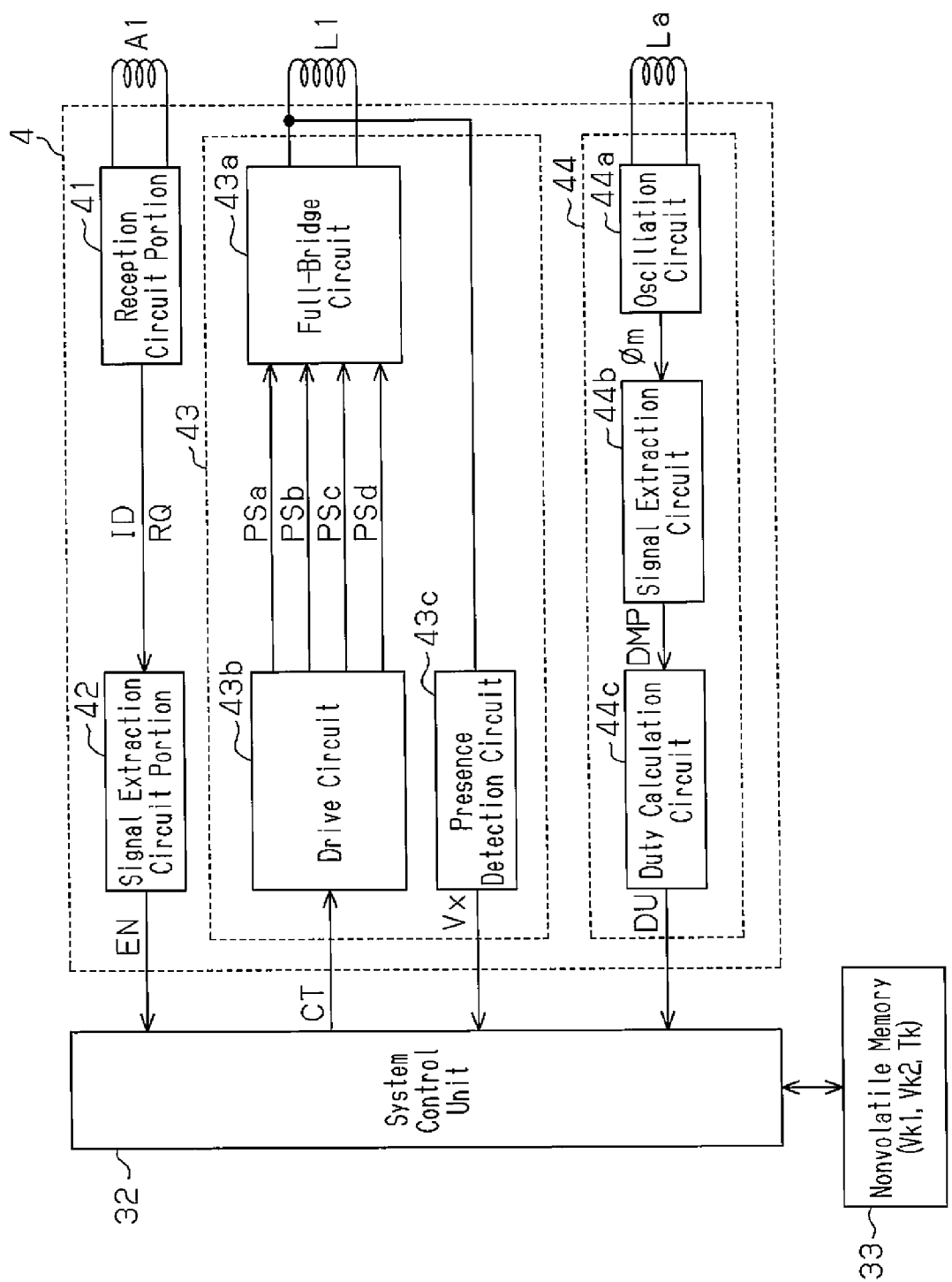
FIG. 8 is an electrical block circuit diagram of a basic power supplying unit circuit arranged in the contactless power supplying device.

As shown in FIG. 8, the basic power supplying unit circuit 4 includes a reception circuit portion 41, a signal extraction circuit portion 42, a power supplying coil excitation drive circuit portion 43, and a metal detection circuit portion 44.

The reception circuit portion 41 is connected to the signal reception antenna coil A1. The reception circuit portion 41 receives a transmission signal from the signal transmission antenna coil A2 of the appliance E set on the setting surface 3 through the signal reception antenna coil A1. The reception circuit portion 41 provides the received transmission signal to the signal extraction circuit portion 42.

The signal extraction circuit portion 42 extracts the appliance authentication signal ID and the excitation request signal RQ from the transmission signal received by the reception circuit portion 41. The signal extraction circuit portion 42 transmits a permission signal EN to the system control unit 32 after extracting both of the appliance authentication signal ID and the excitation request signal RQ. The signal extraction circuit portion 42 does not transmit the permission signal EN to the system control unit 32 when only either one of the appliance authentication signal ID and the excitation request signal RQ is extracted or when both signals are not extracted.

The power supplying coil excitation drive circuit portion 43 is connected to the primary coil L1. In the present embodiment, the power supplying coil excitation drive circuit portion 43 includes a full-bridge circuit 43a that excites the primary coil L1, a drive circuit 43b that drives the full-bridge circuit 43a, and a presence detection circuit 43c. The presence detection circuit 43c is one example of a detection circuit.

The full-bridge circuit 43a is a typical full-bridge circuit. As shown in FIG. 9, the full-bridge circuit 43a includes four MOS transistors Qa, Qb, Qc, and Qd. A set of the MOS transistors Qa and Qd is cross-connected to a set of the MOS transistors Qb and Qc through a series circuit of the primary coil L1 and the resonance capacitor C. The two sets are alternately turned ON and OFF to excite the primary coil L1.

The drive circuit 43b receives an excitation control signal CT from the system control unit 32 of the common unit section 30, and generates drive signals PSa, PSb, PSc, and PSd. The drive signals PSa, PSb, PSc, and PSd are provided to the gate terminals of the MOS transistors Qa, Qb, Qc, and Qd.

When supplying power to the appliance E, the drive circuit 43b generates the drive signals PSa, PSb, PSc, and PSd so as to alternately turn the two sets of the full-bridge circuit 43a ON and OFF based on the excitation control signal CT from the system control unit 32. In this manner, the drive circuit 43b excites the primary coil L1 by full-bridge-operating the circuit 43a.

The drive circuit 43b provides the drive signals PSa, PSd having the same pulse waveform to the gate terminals of the MOS transistors Qa and Qd. The drive circuit 43b also provides the drive signals PSb and PSc, which have the same pulse waveform, to the gate terminals of the MOS transistors Qb and Qc. The pulses of the drive signals PSa and PSd are signals that are complementary to the pulses of the drive signals PSb and PSc.

Accordingly, when supplying power to the appliance E, the set of MOS transistors Qa and Qd and the set of MOS transistors Qb and Qc are alternately turned ON/OFF (full-bridge operation), and the primary coil L1 is excited.

In a standby state, the drive circuit 43b generates the drive signals PSa, PSb, PSc, and PSd so as to change the operation of the full-bridge circuit 43a, which excites the primary coil L1, from the full-bridge operation to the half-bridge operation based on the excitation control signal CT from the system control unit 32.

In the half-bridge operation, for example, the MOS transistor Qa and the MOS transistor Qb are alternately turned ON and OFF in a state in which the MOS transistor Qd is turned ON and the MOS transistor Qc is turned OFF.

For example, when the MOS transistors Qa, Qb, Qc, and Qd are of N-channel types, the drive circuit 43b provides a high level drive signal PSd to the MOS transistor Qd and generates and provides a low level drive signal PSc to the MOS transistor Qc. Further, the drive circuit 43b provides the complementary drive signals PSa and PSb to the MOS transistors Qa and Qb, respectively, so that the MOS transistor Qa and the MOS transistor Qb are alternately turned ON and OFF.

During the standby state, the full-bridge circuit 43a is half-bridge-operated to excite the primary coil L1 and reduce interference caused by magnetic coupling between adjacent primary coils L1. This increases the accuracy for detecting the presence of the appliance E that is set in the power supplying area AR during the standby state.

When an object is set in the power supplying area AR, the spatially coupled object (load) changes the value of the current flowing to the primary coil L1. As described above, when nothing is set in the power supplying area AR (open state in which the load is not present), the value of the current flowing to the primary coil L1 becomes maximal. In contrast, when the object is set in the power supplying area AR (when the load is present), the value of the current flowing to the primary coil L1 decreases as the load increases.

The drive circuit 43b continues to output the drive signals PSa, PSb, PSc, and PSd when the system control unit 32 is outputting the excitation control signal CT to full-bridge-operate the full-bridge circuit 43a. Accordingly, in this case, the full-bridge circuit 43a continuously excites and drives the primary coil L1.

In contrast, the drive circuit 43b intermittently outputs the drive signals PSa, PSb, PSc, and PSd for every predetermined period (e.g., fixed period) when the system control unit 32 is outputting the excitation control signal CT to half-bridge-operate the full-bridge circuit 43a. Accordingly, in this case, the full-bridge circuit 43a intermittently excites and drives the primary coil L1.

The secondary power supplied to the power receiving device (appliance E) by the intermittent exciting and driving of the primary coil L1 is not sufficient enough to immediately drive the load Z of the appliance E when the appliance E is set on the setting surface 3 but is sufficient for charging the rechargeable battery of the load Z. In this case, the data generation circuit section 13 and the transmission circuit section 14 of the appliance E are driven by the secondary power and wireless communication is performed between the appliance E and the power supplying device 1.

Further, when the system control unit 32 determines that a metal piece M is set in the power supplying area AR, the excitation drive circuit 43 intermittently excites and drives the primary coil L1 based on the excitation control signal CT. Accordingly, although the rechargeable battery of the load Z can be charged during the intermittent exciting and driving of the primary coil L1, the temperature of the metal piece M that is set in the power supplying area AR is prevented from being greatly increased by induction heating.

Further, in the same manner as when the appliance E is not set in the power supplying area AR, the excitation drive circuit 43 intermittently excites and drives the primary coil L1 based on the excitation control signal CT even if the signal extraction circuit portion 42 is not outputting the permission signal EN to the system control unit 32.

The presence detection circuit 43c detects the current flowing to the primary coil L1 and generates the voltage corresponding to the current value of the detected current as a presence detection voltage Vx. The presence detection voltage Vx is supplied to the system control unit 32. The presence detection voltage Vx serves as a detection signal.

When the primary coil L1 is excited and driven, as long as an object (load) is not present on the primary coil L1 (power supplying area AR), there is no object (load) that is spatially coupled. Thus, the value of the current flowing to the primary coil L1 becomes large. If an object (load) is present in the primary coil L1 (power supplying area AR), the object (load) that is spatially coupled decreases the current flowing to the primary coil L1.

Accordingly, the presence detection circuit 43c increases the value of the presence detection voltage Vx if an object (load) is not present on the primary coil L1 (power supplying are AR). The presence detection circuit 43c reduces the value of the presence detection voltage Vx if the object (load) is present on the primary coil L1 (power supplying are AR).

The system control unit 32 receives the presence detection voltage Vx and determines that something is set in the power supplying area AR if the presence detection voltage Vx is between a lower reference voltage Vk1 and an upper reference voltage Vk2 (Vk1<Vx<Vk2) as determined in advance.

When the presence detection voltage Vx is greater than or equal to the upper reference voltage Vk2, the system control unit 32 determines that nothing is set in the power supplying area AR. When the presence detection voltage Vx is less than or equal to the lower reference voltage Vk1, the system control unit 32 determines that something is set in the power supplying area AR, and the object (load) that is set is apparently not the appliance E, which should be supplied with power.

The lower reference voltage Vk1 and the upper reference voltage Vk2 are set in advance to values obtained through experiments, tests, calculations, and the like and are stored in advance in the nonvolatile memory 33 of the common unit section 30. The system control unit 32 reads the lower reference voltage Vk1 and the upper reference voltage Vk2 from the nonvolatile memory 33 and compares them with the presence detection voltage Vx.

As shown in FIG. 8, the metal detection circuit portion 44 includes an oscillation circuit 44a, a signal extraction circuit 44b, and a duty calculation circuit 44c.

The oscillation circuit 44a is connected to the primary side metal detection coil La. In the present embodiment, the oscillation circuit 44a and the primary side metal detection coil La configure a Colpitts oscillation circuit. The oscillation circuit 44a performs the oscillation operation based on the DC voltage applied from the power supply circuit 31. The oscillation circuit 44a transmits the oscillation signal Φt, which is formed by a sine wave having a fixed amplitude value and frequency shown in FIG. 10A, from the primary side metal detection coil La towards the secondary side metal detection coil Lb of the appliance E set on the setting surface 3.

The oscillation signal Φt oscillated by the oscillation circuit 44a configures a carrier signal, as described above. In other words, the appliance E generates the ON/OFF signal MP based on the amplitude value of the oscillation signal Φt. The appliance E generates the modulated wave signal Φm by amplitude-modulating the carrier signal with the ON/OFF signal MP having a duty DU corresponding to the amplitude value, and the appliance E transmits the modulated wave signal Φm from the secondary side metal detection coil Lb. In this case, when the positional relationship of the primary side metal detection coil La relative the secondary side metal detection coil Lb changes, the inductances of the primary side metal detection coil La and the secondary side metal detection coil Lb change, and the amplitude value and the frequency of the oscillation signal Φt change accordingly. In this case, the amount of change in the amplitude value and the frequency when the metal piece M is sandwiched between the primary side metal detection coil La and the secondary side metal detection coil Lb is large compared to the change in the amplitude value and the frequency caused by displacement between the primary side metal detection coil La and the secondary side metal detection coil Lb. Thus, the change in the oscillation signal Φt allows for displacement of the coils La and Lb to be distinguished from the presence of a metal piece M between the coils La and Lb.

The modulated wave signal Φm, which is shown in FIG. 10C or FIG. 10G and generated in the appliance E, is received by the primary side metal detection coil La of the power supplying device 1 and provided to the signal extraction circuit 44b via the oscillation circuit 44a.

The signal extraction circuit 44b includes an envelope detection circuit, which detects the modulated wave signal Φm provided via the oscillation circuit 44a. The signal extraction circuit 44b (envelope detection circuit) demodulates an envelope waveform signal (demodulation signal DMP) of the modulated wave signal Φm, that is, the ON/OFF signal MP, from the modulated wave signal Φm. The signal extraction circuit 44b (envelope detection circuit) includes a waveform shaping circuit, which waveform-shapes the demodulation signal DMP (ON/OFF signal MP).

The duty calculation circuit 44c calculates the duty DU of the demodulation signal DMP (ON/OFF signal MP). In the present embodiment, the duty calculation circuit 44c obtains the cycle Tn and the ON time t1 of the demodulation signal DMP (ON/OFF signal MP). The duty calculation circuit 44c calculates the duty DU (DU=t1/Tn) from the cycle Tn and the ON time t1. The duty calculation circuit 44c provides the system control unit 32 with the duty DU of the ON/OFF signal MP that is obtained as a calculated value.

The system control unit 32 determines whether or not a metal piece M is present based on the duty DU of the demodulation signal DMP (ON/OFF signal MP) from the duty calculation circuit 44c. For instance, the system control unit 32 compares a reference duty DUk, which is stored in advance in the nonvolatile memory 33 of the common unit section 30, and the duty DU of the demodulation signal DMP (ON/OFF signal MP) to determine whether or not the metal piece M is present.

The reference duty DUk is a duty DU calculated in the duty calculation circuit 44c based on the modulated wave signal Φm received by the metal detection circuit portion 44 in a state in which the metal piece M is not arranged between the power supplying area AR and the appliance E. The reference duty DUk is set to a value obtained in advance through experiments, tests, calculations, and the like and is stored in advance in the nonvolatile memory 33.

Accordingly, in a state in which the metal piece M is arranged in the power supplying area AR, the amplitude of the oscillation signal Φt becomes smaller and the duty DU of the ON/OFF signal MP becomes longer. As a result, the system control unit 32 determines that a metal piece M is present in the power supplying area AR when the duty DU from the duty calculation circuit 44c is greater than the reference duty DUk. On the contrary, the system control unit 32 determines that a metal piece M is not present in the power supplying area AR when the duty DU from the duty calculation circuit 44c is less than or equal to the reference duty DUk.

The system control unit 32 receives the presence detection voltage Vx from the presence detection circuit 43c and waits for the duty DU of the ON/OFF signal from the duty calculation circuit 44c to be provided after determining that the presence detection voltage Vx is between the lower reference voltage Vk1 and the upper reference voltage Vk2. Then, when determining that the metal piece M is not present in the power supplying area AR, the system control unit 32 waits for the permission signal EN from the signal extraction circuit portion 42. When receiving the permission signal EN from the signal extraction circuit portion 42 in this state, the system control unit 32 provides the excitation control signal CT, which is for full-bridge operation, to the power supplying coil excitation drive circuit portion 43 of the basic power supplying unit circuit 4.

If the presence detection voltage Vx from the presence detection circuit 43c is not between the lower reference voltage Vk1 and the upper reference voltage Vk2, the system control unit 32 does not provide the excitation control signal CT that is for full-bridge operation to the power supplying coil excitation drive circuit portion 43. In this case, the system control unit 32 provides the excitation control signal CT that is for half-bridge operation to the power supplying coil excitation drive circuit portion 43 and intermittently excites and drives the primary coil L1.

When the permission signal EN from the signal extraction circuit portion 42 is not received, in the same manner, the system control unit 32 provides the excitation control signal CT that is for half-bridge operation to the power supplying coil excitation drive circuit portion 43 and intermittently excites and drives the primary coil L1.

Further, when determining that a metal piece M is present in the power supplying area AR, in the same manner, the system control unit 32 provides the excitation control signal CT that is for half-bridge operation to the power supplying coil excitation drive circuit portion 43 and intermittently excites and drives the primary coil L1.

The operation of the power supplying device 1 will now be described.

When a power switch (not shown) is turned ON and commercial power is supplied to the power supply circuit 31, the power supply circuit 31 supplies DC voltage to the system control unit 32, the nonvolatile memory 33, and each basic power supplying unit circuit 4 as driving power.

When receiving the driving power from the power supply circuit 31, the system control unit 32 provides the excitation control signal CT, which is for half-bridge operating the full-bridge circuit 43a of the basic power supplying unit circuit 4, to the drive circuit 43b.

The drive circuit 43b of the basic power supplying unit circuit 4 half-bridge operates the full-bridge circuit 43a and intermittently excites and drives the primary coil L1 in response to the excitation control signal CT.

Subsequently, the power supplying device 1 waits for the appliance E to be set in the power supplying area AR of the setting surface 3. In this state, the system control unit 32 repeatedly executes (1) a presence detection processing operation, (2) a metal foreign object detection processing operation, and (3) a machine type detection processing operation.

In the presence detection processing operation, the system control unit 32 controls the basic power supplying unit circuit 4 (power supplying coil excitation drive circuit portion 43) and detects whether or not an object is set in the power supplying area AR.

In the metal foreign object detection processing operation, the system control unit 32 controls the basic power supplying unit circuit 4 (metal detection circuit portion 44) and performs the detection of the metal piece M in the power supplying area AR.

In the machine type detection processing operation, the system control unit 32 controls the basic power supplying unit circuit (reception circuit portion 41 and signal extraction circuit portion 42) and performs the detection of a power supplying request of the appliance E.

The presence detection processing operation, the metal foreign object detection processing operation, and the machine type detection processing operation will now be described in detail.

(Presence Detection Processing Operation)

The presence detection circuit 43c arranged in the power supplying coil excitation drive circuit portion 43 of each basic power supplying unit circuit 4 detects the value of the current flowing to the corresponding primary coil L1 as the presence detection voltage Vx. Each presence detection circuit 43c supplies the presence detection voltage Vx to the system control unit 32.

When receiving the presence detection voltage Vx from each presence detection circuit 43c, the system control unit 32 determines whether or not the presence detection voltage Vx is between the lower reference voltage Vk1 and the upper reference voltage Vk2. If the presence detection voltage Vx is between the lower reference voltage Vk1 and the upper reference voltage Vk2, the system control unit 32 determines that an object is present in the power supplying area AR to which the presence detection circuit 43c belongs.

If the presence detection voltage Vx is greater than or equal to the upper reference voltage Vk2, the system control unit 32 determines that an object is not present in the power supplying area AR to which the presence detection circuit 43c belongs.

(Metal Foreign Object Detection Processing Operation)

The oscillation circuit 44a of the metal detection circuit portion 44 in each basic power supplying unit circuit 4 is oscillation-operated based on the supply of the DC voltage and transmits the oscillation signal Φt from the corresponding primary side metal detection coil La.

The secondary side metal detection coil Lb of the appliance E receives the oscillation signal Φt from the primary side metal detection coil La. The rectifier circuit 21 of the modulation circuit 20 half-wave-rectifies the oscillation signal Φt received by the secondary side metal detection coil Lb (refer to FIG. 6).

The DC voltage obtained by half-wave rectifying the oscillation signal Φt is supplied to the modulation wave signal generation circuit section 22 (multivibrator 22a) as the charging voltage Vt (power supply voltage VG) (refer to FIG. 7).

The value of the DC voltage (power supply voltage VG) generated by the rectifier circuit 21 is varied by the amplitude value of the oscillation signal Φt, that is, whether or not a metal piece M is set in the power supplying area AR.

If a metal piece M is not set in the power supplying area AR, the oscillation signal Φt oscillates as shown in FIG. 10A. On the other hand, if a metal piece M is set in the power supplying area AR, the oscillation signal Φt oscillates as shown in FIG. 10E. Accordingly, when the metal piece M is not present in the power supplying area AR, the amplitude value of the oscillation signal Φt, that is, the charging voltage Vt becomes large compared to when the metal piece M is present.

As a result, the duty DU of the ON/OFF signal MP output from the multivibrator 22a becomes as shown in FIG. 10B when a metal piece M is not set in the power supplying area AR and becomes as shown in FIG. 10F when a metal piece M is set in the power supplying area AR. That is, as shown in FIGS. 10B and 10F, the duty DU of the ON/OFF signal MP becomes large when a metal piece M is set in the power supplying area AR compared to when a metal piece M is not set.

The ON/OFF signal MP is applied to the gate terminal of the transistor Q3 of the modulation circuit section 23 to turn ON and OFF the transistor Q3. By turning the transistor Q3 ON and OFF, the current (oscillation signal Φt) flowing to the secondary side metal detection coil Lb is amplitude-modulated and generated as the modulated wave signal Φm. The modulated wave signal Φm is transmitted from the secondary side metal detection coil Lb to the primary side metal detection coil La.

In this case, if the metal piece M is not set in the power supplying area AR, the waveform of the modulated wave signal Φm is generated as shown in FIG. 10C in accordance with the duty DU of the ON/OFF signal shown in FIG. 10B. If the metal piece M is set in the power supplying area AR, the waveform of the modulated wave signal Φm is generated as shown in FIG. 10G in accordance with the duty DU of the ON/OFF signal shown in FIG. 10F.

The primary side metal detection coil La receives the modulated wave signal Φm transmitted from the secondary side metal detection coil Lb. The modulated wave signal Φm received by the primary side metal detection coil La is provided to the signal extraction circuit 44b (detection circuit) through the oscillation circuit 44a.

The signal extraction circuit 44b (detection circuit) demodulates the envelope waveform signal (demodulation signal DMP) enveloping the outer side of the modulated wave signal Φm, that is, the ON/OFF signal MP, from the modulated wave signal Φm. The signal extraction circuit 44b (detection circuit) provides the demodulation signal DMP (ON/OFF signal MP) to the duty calculation circuit 44c.

Accordingly, the duty DU of the demodulation signal DMP (ON/OFF signal MP) generated by the signal extraction circuit 44b becomes as shown in FIG. 10D if a metal piece M is not set in the power supplying area AR and becomes as shown in FIG. 10H if the metal piece M is set in the power supplying area AR. That is, the duty DU of the demodulation signal DMP (ON/OFF signal MP) becomes large when a metal piece M is set in the power supplying area AR compared to when a metal piece M is not set, as shown in FIGS. 10B and 10F.

The signal extraction circuit 44b (detection circuit) provides the demodulation signal DMP (ON/OFF signal MP) to the duty calculation circuit 44c. The duty calculation circuit 44c calculates the duty DU of the demodulation signal DMP (ON/OFF signal MP) and provides the calculated value (DU) to the system control unit 32.

The system control unit 32 compares the duty DU of the demodulation signal DMP (ON/OFF signal MP) provided from each basic power supplying unit circuit 4 with the reference duty DUk.

The system control unit 32 determines that a metal piece M is present in the power supplying area AR immediately above the primary side metal detection coil La excited by the corresponding metal detection circuit portion 44 when the duty DU of the demodulation signal DMP (ON/OFF signal MP) is greater than the reference duty DUk.

When the duty DU of the ON/OFF signal MP is less than or equal to the reference duty DUk, the system control unit 32 determines that a metal piece M is not present in the power supplying area AR immediately above the primary side metal detection coil La excited by the corresponding metal detection circuit portion 44 when the duty DU of the ON/OFF signal MP is less than or equal to the reference duty DUk.

(Machine Type Detection Processing Operation)

When the appliance E is set in the power supplying area AR, the secondary coil L2 of the appliance E receives the secondary power based on the intermittent exciting and driving of the primary coil L1. Based on the secondary power, the appliance E generates the appliance authentication signal ID and the excitation request signal RQ with the data generation circuit section 13 of the power receiving circuit 10. The transmission circuit section 14 transmits the appliance authentication signal ID and the excitation request signal RQ from the signal transmission antenna coil A2 toward the signal reception antenna coil A1 of the power supplying device 1.

The signal extraction circuit portion 42 of the power supplying device 1 extracts the appliance authentication signal ID and the excitation request signal RQ from the transmission signal received by the reception circuit portion 41 through the signal reception antenna coil A1. The signal extraction circuit portion 42 provides the permission signal EN to the system control unit 32 after extracting both of the appliance authentication signal ID and the excitation request signal RQ.

When the permission signal EN is received from the signal extraction circuit portion 42, the system control unit 32 determines that the appliance E, which is of a machine type that can be supplied with power by the power supplying device 1, is set in the power supplying area AR, to which the signal extraction circuit portion 42 belongs.

When the permission signal EN is not received from the signal extraction circuit portion 42, the system control unit 32 determines that the appliance E or an object, which cannot be supplied with power by the power supplying device 1, is set in the power supplying area AR even if determined in the presence detection processing operation that an object is set.

(Power Supply to Appliance E)

The system control unit 32 repeats the presence detection processing operation, the metal foreign object detection processing operation, and the machine type detection processing operation. The system control unit 32 continuously excites and drives the primary coil L1 located immediately below the power supplying area AR when detecting the presence of the object in any of the power supplying areas AR, determining that the metal piece M is not present, and receiving the permission signal EN generated when the object is the appliance E. In other words, the system control unit 32 provides the excitation control signal CT that full-bridge-operates the full-bridge circuit 43a to the drive circuit 43b of the basic power supplying unit circuit 4 of the power supplying area AR in which the appliance E is set.

When the primary coil L1 is continuously excited and driven, the appliance E set in the power supplying area AR of the power supplying device 1 receives the secondary power via the secondary coil L2 based on the continuous exciting and driving of the primary coil L1. The appliance E supplies the power for driving the load Z from the power receiving circuit 10 (rectifying-smoothing circuit section 11 and DC/DC converter circuit 12) to the load Z.

The system control unit 32 stops the supply of power to the appliance E when detected in the metal foreign object detection processing operation that a metal piece M is present in the power supplying area AR that is supplied with power. In this case, the system control unit 32 switches the excitation operation of the primary coil L1 of the power supplying area AR from continuous exciting and driving to intermittent exciting and driving. In other words, the system control unit 32 provides the excitation control signal CT that half-bridge-operates the full-bridge circuit 43a to the drive circuit 43b of the basic power supplying unit circuit 4 located immediately below the appliance E.

The system control unit 32 also stops the power supply to the appliance E when detected in the presence detection processing operation that the appliance E has been removed from the power supplying area A supplied with power. Here, in the same manner, the system control unit 32 switches the excitation operation of the primary coil L1 of the power supplying area AR from continuous exciting and driving to the intermittent exciting and driving. In other words, the system control unit 32 provides the excitation control signal CT for half-bridge operating the full-bridge circuit 43a to the drive circuit 43b for exciting the primary coil L1 located immediately below the appliance E.

Furthermore, the system control unit 32 also stops the power supply to the appliance E even when detected in the machine type detection processing operation that the excitation request signal RQ is no longer output from the appliance E being power supplied and the permission signal EN is absent. Similarly in this case, the system control unit 32 switches the excitation operation of the primary coil L1 located immediately below the power supplying area AR from the continuous exciting and driving to intermittent exciting and driving. In other words, the system control unit 32 provides the excitation control signal CT that half-bridge-operates the full-bridge circuit 43a to the drive circuit 43b, which excites the primary coil L1 located immediately below the appliance E.

The contactless power supplying device of the first embodiment has the advantages described below.

(1) A plurality of power supplying areas AR are defined in the setting surface 3 of the power supplying device 1, and the primary coil L1 is arranged in each power supplying area AR. Accordingly, regardless of the power supplying area AR of the setting surface 3 in which the appliance E is set, the primary coil L1 of the power supplying area AR, in which the appliance E is set, is excited and driven. This allows for the power supplying device 1 to supply power to the appliance E regardless of the power supplying area AR of the setting surface 3 in which the appliance E is set is.

(2) The primary side metal detection coil La for performing metal detection is arranged in each power supplying area AR. Accordingly, the power supplying device 1 can detect the metal piece M regardless of the power supplying area AR of the setting surface 3 in which the metal piece M is set.

(3) The power supplying device 1 determines whether or not a metal piece M is present with the duty DU of the ON/OFF signal MP. In other words, the ON/OFF signal MP is generated as a modulation wave. Thus, even if the adjacent primary coils L1 interfere with each other thus changing the excitation frequency in the power supplying device 1 in which a plurality of primary coils L1 are adjacently arranged, the metal detection is performed with high accuracy and is subtly affected by changes in the excitation frequency.

(4) The system control unit 32 determines whether or not a metal piece M is present in each power supplying area AR based on the duty DU calculated by the metal detection circuit portion 44 of each basic power supplying unit circuit 4.

In this configuration, the system control unit 32 determines whether or not a metal piece M is present just by comparing the duty DU from the metal detection circuit portion 44 of each basic power supplying unit circuit 4 with the reference duty DUk. As a result, the load of the system control unit 32 can be drastically reduced.

(5) The information indicating whether or not a metal piece M is present, that is, the ON/OFF signal MP, is generated in the appliance E. This simplifies the circuit configuration and reduces the processing load on the power supplying device 1. Thus, an inexpensive contactless power supplying device can be realized.

(6) When generating the modulated wave signal Φm, the oscillation signal Φt from the oscillation circuit 44a of the metal detection circuit portion 44 is used as a carrier signal. This allows for elimination of an oscillation circuit that separately generates the carrier signal.

(7) The modulated wave signal Φm is generated by amplitude modulation. Thus, compared to when generated through other frequency modulations or the like, the circuit for generating the modulated wave signal Φm has a simple configuration and the circuit can be inexpensively configured. The signal extraction circuit 44b (detection circuit) that demodulates the modulated wave signal Φm can also be easily and inexpensively configured.

(8) The charging voltage Vt of the charging and discharging capacitor C0 of the rectifier circuit 21 is supplied to the multivibrator 22a of the modulation wave signal generation circuit section 22 as the power supply voltage VG. In this configuration, the duty DU of the ON/OFF signal MP of the multivibrator 22a is changed by the power supply voltage VG, which changes in accordance with whether or not a metal piece M is present. Accordingly, the modulation wave (ON/OFF signal MP) indicating whether or not a metal piece M is present is generated with the multivibrator 22a, which has a simple circuit configuration.

(9) The power supplying device 1 does not change the excitation frequency of the primary coil L1 for supplying power in each basic power supplying unit circuit 4 when performing the metal detection. As a result, a plurality of excitation frequencies do not need to be set in the primary coil L1, and the excitation frequency of the primary coil L1 does not need to be switched whenever metal detection is performed. A complex and expensive control circuit is thus unnecessary. This realizes an inexpensive contactless power supplying device.

(10) The power supplying device 1 half-bridge-operates the full-bridge circuit 43a during a standby state. Thus, interference caused by magnetic coupling between adjacent primary coils L1 is reduced in a standby state. This improves the accuracy of the presence detection of the appliance E set in the power supplying area AR.

It should be apparent to those skilled in the art that the present invention may be embodied in many other specific forms without departing from the spirit or scope of the invention. Particularly, it should be understood that the present invention may be embodied in the following forms.

In the embodiment described above, the signal reception antenna coil A1 is arranged in each power supplying area AR of the power supplying device 1, and the signal transmission antenna coil A2 is arranged in the appliance E. However, the antenna coils A1 and A2 may be omitted.

Figure 11:
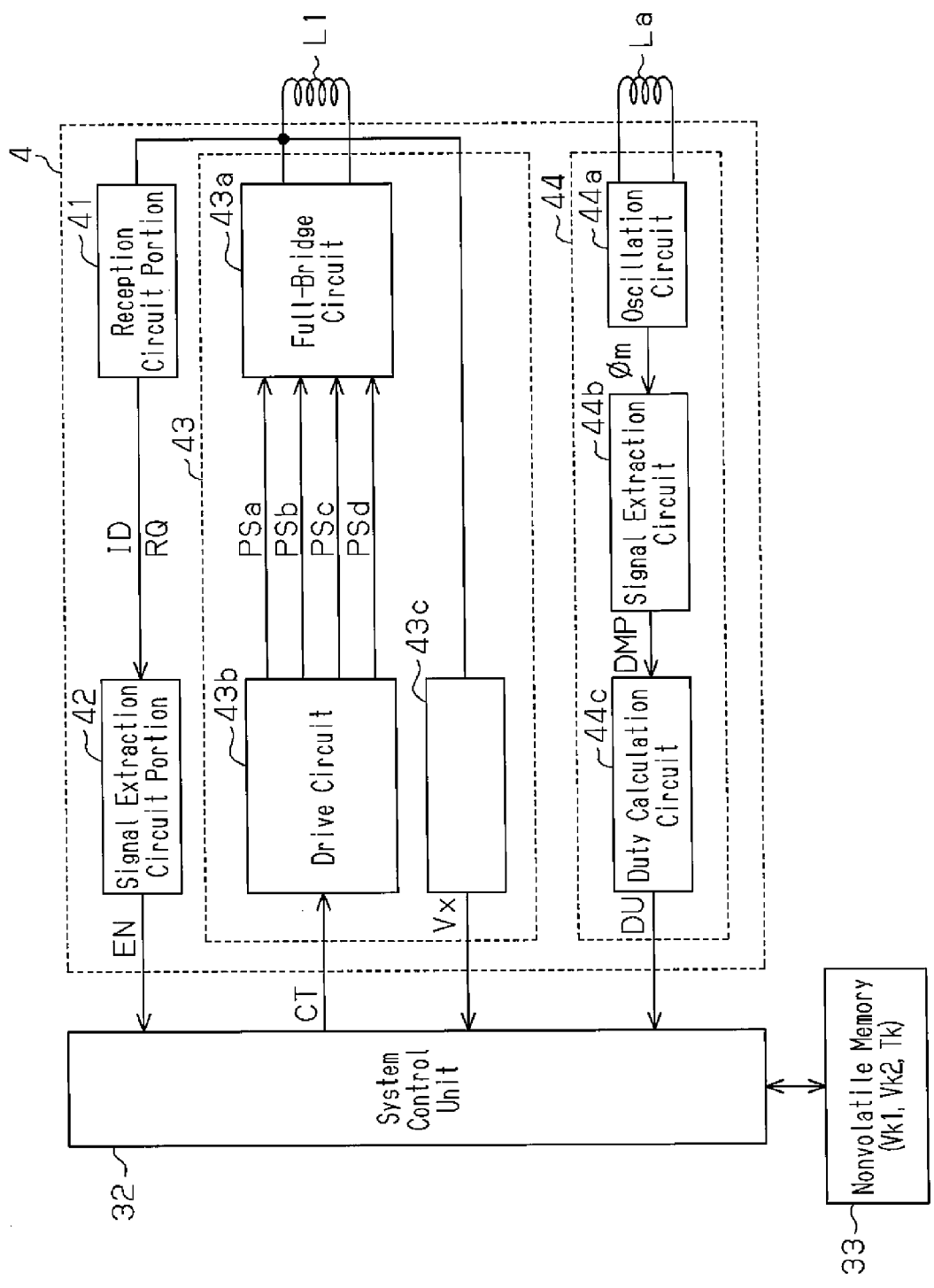
FIG. 11 is an electrical block circuit diagram of a basic power supplying unit circuit in another example.

For instance, as shown in FIG. 11, the input terminal of the reception circuit portion 41 and the input terminal of the presence detection circuit 43c are connected to the primary coil L1. In this case, the reception circuit portion 41 may extract the appliance authentication signal ID and the excitation request signal RQ from the modulated excitation signal received by the primary coil L1.

In this configuration, the presence detection circuit 43c may detect the value of the current flowing to the primary coil L1 as the presence detection voltage Vx and determine whether or not an object is present in the power supplying area AR.

Figure 12:
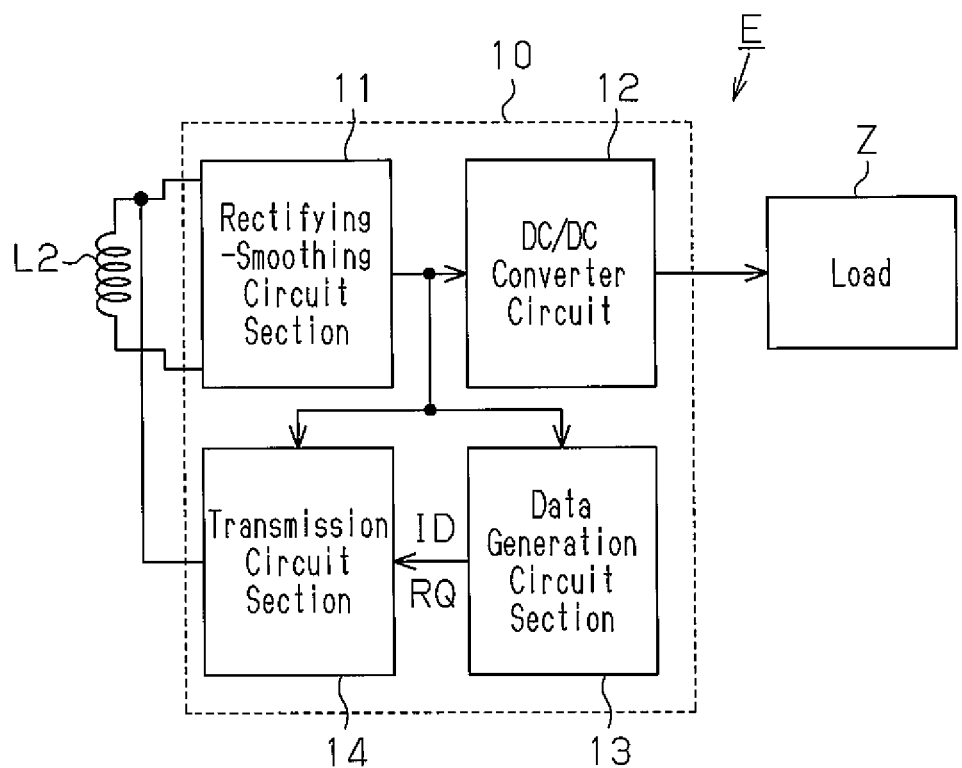
FIG. 12 is an electrical block circuit diagram of a power receiving circuit in another example.

As shown in FIG. 12, when omitting the antenna coils A1 and A2, the output terminal of the transmission circuit section 14 is connected to the secondary coil L2 in the appliance E. In this case, the transmission circuit section 14 transmits the appliance authentication signal ID and the excitation request signal RQ from the data generation circuit section 13 to the primary coil L1 of the power supplying device 1 through the secondary coil L2.

Specifically, in the same manner as the metal detection process in the modulation circuit section 23, the excitation signal from the primary coil L1 received by the secondary coil L2 is modulated to include bits of the signals ID and RQ based on the appliance authentication signal ID and the excitation request signal RQ generated by the data generation circuit section 13. The appliance authentication signal ID and the excitation request signal RQ may be extracted from the modulated excitation signal received by the primary coil L1.

The primary side metal detection coil La and signal reception antenna coil A1 of each power supplying area AR and the secondary side metal detection coil Lb and signal transmission antenna coil A2 of the appliance E may be omitted.

Figure 13:
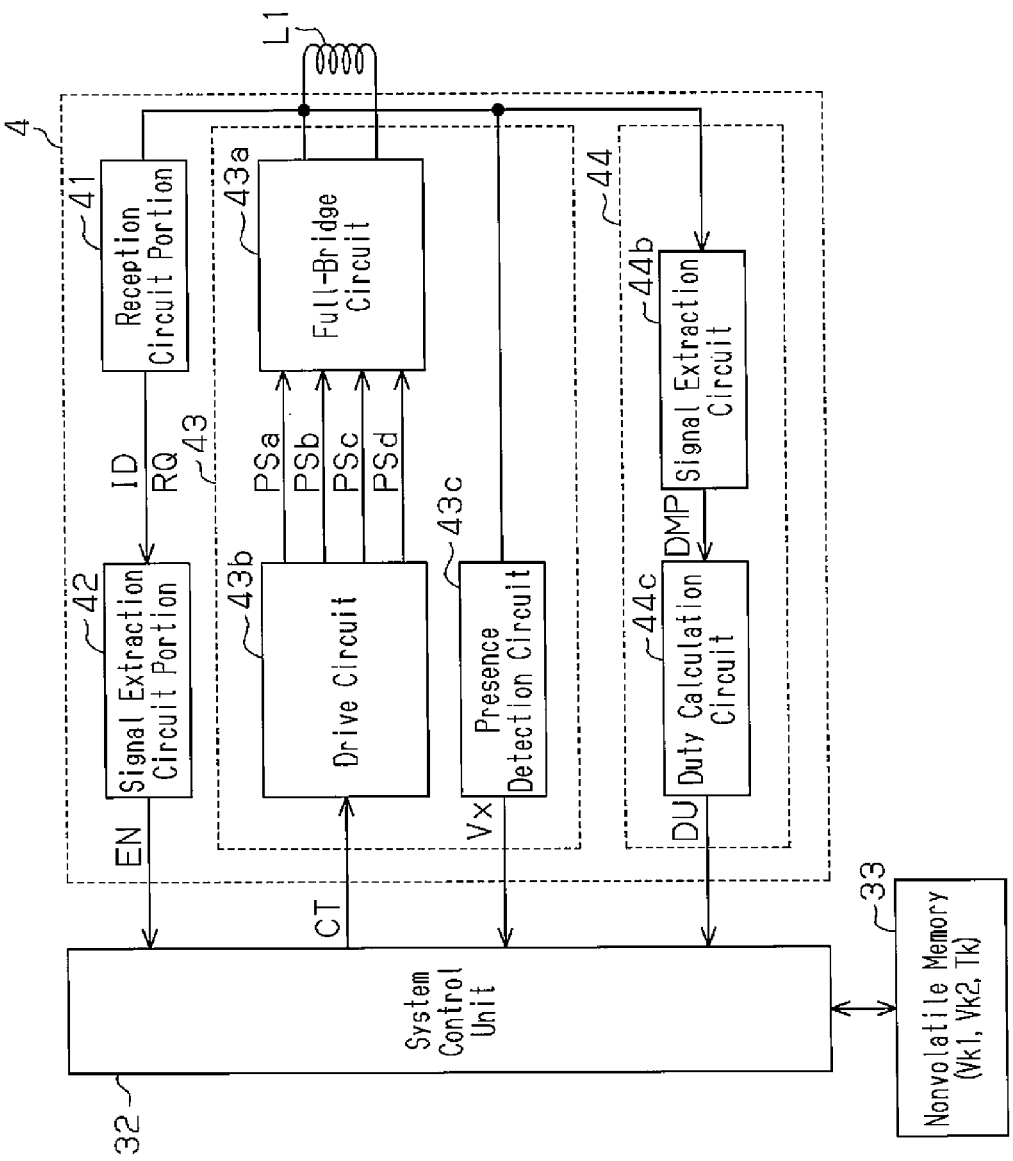
FIG. 13 is an electrical block circuit diagram of a basic power supplying unit circuit in a further example.

For instance, as shown in FIG. 13, the input terminal of the reception circuit portion 41, the input terminal of the presence detection circuit 43c, and the input terminal of the signal extraction circuit 44b are connected to the primary coil L1. In this case, instead of the primary side metal detection coil La, the primary coil L1 functions as a primary detection coil, and the full-bridge circuit 43a functions as an excitation drive circuit. The reception circuit portion 41 may extract the appliance authentication signal ID and the excitation request signal RQ from the modulated excitation signal received by the primary coil L1. The presence detection circuit 43c may detect the value of the current flowing to the primary coil L1 as the presence detection voltage Vx and determine whether or not an object is present in the power supplying area AR.

The signal extraction circuit 44b receives the modulated wave signal Φm through the primary coil L1. The signal extraction circuit 44b demodulates the envelope waveform signal (demodulation signal DMP), that is, the ON/OFF signal MP enveloping the outer side of the modulated wave signal Φm, from the modulated wave signal Φm. The signal extraction circuit 44b (detection circuit) provides the demodulation signal DMP (ON/OFF signal MP) to the duty calculation circuit 44c.

Figure 14:
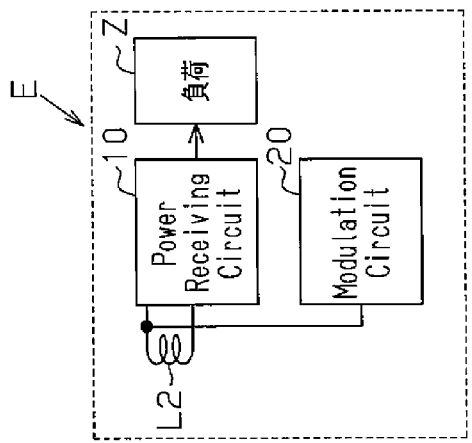
FIG. 14 is an electrical block circuit diagram of an electric appliance in a further example.

As shown in FIG. 14, when omitting the coils La, Lb, A1, and A2, the input terminal of the modulation circuit 20 is connected to the secondary coil L2 in the appliance E. In this case, instead of the secondary side metal detection coil Lb, the secondary coil L2 functions as a secondary detection coil. The modulation circuit 20 transmits the modulated wave signal Φm generated by amplitude modulation to the primary coil L1 through the secondary coil L1.

Specifically, when performing metal detection using the primary coil L1 and the secondary coil L2, the modulation wave signal generation circuit section 22 generates the ON/OFF signal MP based on the power supply voltage supplied from the rectifying-smoothing circuit section 11 of the power receiving circuit 10 and provides the ON/OFF signal MP to the modulation circuit section 23.

The modulation circuit section 23 modulates the amplitude of the secondary current flowing through the secondary coil L2 with the ON/OFF signal MP (duty DU of the ON/OFF signal MP) and transmits the amplitude-modulated excitation signal, that is, the modulated wave signal Φm, from the secondary coil L2 to the primary coil L1. The metal detection circuit portion 44 of the basic power supplying unit circuit 4 calculates the duty DU of the ON/OFF signal MP based on the excitation signal (modulated wave signal Φm) received by the primary coil L1.

This allows for the primary side metal detection coil La and signal reception antenna coil A1 of each power supplying area AR and the secondary side metal detection coil Lb and the signal transmission antenna coil A2 of the appliance to be omitted and allows for an inexpensive power supplying device 1 to be realized.

In the embodiment described above, the metal detection circuit portion 44 of each basic power supplying unit circuit 4 calculates the duty DU of the ON/OFF signal MP and provides the calculated value (DU) to the system control unit 32 to reduce the load on the system control unit 32. Instead, the metal detection circuit portion 44 of each basic power supplying unit circuit 4 may provide the demodulation signal DMP of the modulated wave signal Φm to the system control unit 32. The system control unit 32 may then calculate the duty DU of the demodulation signal DMP, that is, the ON/OFF signal MP and determine whether or not a metal piece M is present based on the calculated value (DU) (metal foreign object detection processing operation).

In the embodiment described above, the center of the primary side metal detection coil La is aligned with the center of the power supplying area AR. However, the center of the primary side metal detection coil La may be deviated from the center of the power supplying area AR.

In the embodiment described above, the oscillation circuit 44a of the metal detection circuit portion 44 is a Colpitts oscillation circuit but not limited to a Colpitts oscillation circuit and may be a different oscillation circuit such as a Hartley oscillation circuit or the like.

In the embodiment described above, the shape of the primary coil L1 and the secondary coil L2 is tetragonal but does not have to be tetragonal. For instance, the primary coil L1 and the secondary coil L2 may have a shape that is not tetragonal and may be polygonal, circular, etc. The size of the primary coil L1 and the secondary coil L2 is also not particularly limited. For example, the size of the primary coil L1 relative to the size of the secondary coil L2 may be different.

The shapes of the primary side metal detection coil La and the secondary side metal detection coil Lb are not limited to the shapes described in the above embodiment and may have other shapes such as a polygon, which includes a tetragon, or an ellipse and the like, which is not a circle.

It is obvious that the shapes of the signal reception antenna coil A1 and the signal transmission antenna coil A2 are not limited to the shapes described in the above embodiment and may be different shapes such as a polygon, which includes a square, or an ellipse and the like, which is not a circle.

In the embodiment described above, the number of primary coils L1 is the same as the number of primary side metal detection coils La. In other words, one primary side metal detection coil La is arranged for one primary coil L1, that is, one primary side metal detection coil La is arranged in one power supplying area AR. However, the number of primary coils L1 does not have to be the same as the number of primary side metal detection coils La.

For instance, the number of primary side metal detection coils La may be less than the number of primary coils L1. For example, one primary side metal detection coil La may be assigned to a plurality of (e.g., four) primary coils L1. In this case, the size of one primary side metal detection coil La is enlarged so that the metal detection can be performed on a plurality of power supplying areas AR corresponding to a plurality of primary coils L1.

In the embodiment described above, the primary coil L1 is formed to be tetragonal in accordance with the power supplying area AR, and the primary coils L1 are arranged in a grid form. However, the shape and arrangement of the primary coil L1 is not limited to the embodiment described above. For example, the shape of the primary coil L1 may be a hexagon, and the primary coils L1 may be arranged in a honeycomb form.

In the embodiment described above, until the appliance E is set on the setting surface 3, (1) presence detection processing operation→(2) metal foreign object detection processing operation→(3) machine type detection processing operation→(1) presence detection processing operation→(2) metal foreign object detection processing operation→(3) machine type detection processing operation→and so on are repeatedly executed.

The repetition may be performed in the order of (1) presence detection processing operation→(3) machine type detection processing operation→(2) metal foreign object detection processing operation→(1) presence detection processing operation→(3) machine type detection processing operation→(2) metal foreign object detection processing operation→and so on.

Further, the repetition may be performed in the order of (1) presence detection processing operation→(2) metal foreign object detection processing operation→(3) machine type detection processing operation→(2) metal foreign object detection processing operation→(3) machine type detection processing operation→(2) metal foreign object detection processing operation→(3) machine type detection processing operation→and so on. In this case, when the presence is detected in the first presence detection processing operation, the metal foreign object detection processing operation and machine type detection processing operation can be subsequently repeated to stop the excitation of the primary coil L1.

Moreover, the repetition may be performed in the order of (1) presence detection processing operation→(3) machine type detection processing operation→(2) metal foreign object detection processing operation→(3) machine type detection processing operation→(2) metal foreign object detection processing operation→(3) machine type detection processing operation→(2) metal foreign object detection processing operation→and so on. In the same manner, in this case, when the presence is detected in the first presence detection processing operation, the metal foreign object detection processing operation and the machine type detection processing operation can be subsequently repeated to stop the excitation of the primary coil L1.

In the embodiment described above, the common unit section 30 includes the nonvolatile memory 33, and the nonvolatile memory 33 stores the reference duty DUk for determining whether or not a metal piece M is present. Instead, for example, the duty calculation circuit 44c of each power supplying unit circuit 4 may store the reference duty DUk.

In this case, the duty calculation circuit 44c of each power supplying unit circuit 4 compares the duty DU with the reference duty DUk to determine whether or not a metal piece M is present. That is, whether or not a metal piece M is present is determined in each basic power supplying unit circuit 4. The duty calculation circuit 44c notifies the determination result to the system control unit 32.

The system control unit 32 performs the excitation control of the primary coil L1 of each basic power supplying unit circuit 4 based on the determination result. This reduces the load on the system control unit 32.

Further, the lower reference voltage Vk1 and the upper reference voltage Vk2 for determining whether or not the object (load) is set in the power supplying area AR are stored in the nonvolatile memory 33. For example, the presence detection circuit 43c of each power supplying unit circuit 4 may store the lower reference voltage Vk1 and the upper reference voltage Vk2.

In this case, the presence detection circuit 43c of each basic power supplying unit circuit 4 determines whether or not an object (load) is present in the power supplying area AR by comparing the presence detection voltage Vx with the lower reference voltage Vk1 and the upper reference voltage Vk2. That is, the determination of whether or not an object (load) is present is performed in each power supplying unit circuit 4. The presence detection circuit 43c notifies the determination result to the system control unit 32.

The load on the system control unit 32 is thus further reduced. Further, if the storage of the reference duty DUk, the lower reference voltage Vk1, and the upper reference voltage Vk2 is omitted from the nonvolatile memory 33, the nonvolatile memory 33 becomes unnecessary. This reduces the cost of the contactless power supplying device 1.

In the embodiment described above, the operation of the full-bridge circuit 43a is switched from the full-bridge operation to the half-bridge operation when the power supplying device 1 shifts to a standby state. In place of the half-bridge operation, for example, all four MOS transistors Qa, Qb, Qc, and Qd of the full-bridge circuit 43a may be turned OFF during a standby state. Obviously, the two upper MOS transistors Qa and Qc may be turned OFF and the two lower MOS transistors Qb and Qd may be turned ON and be controlled so as not to magnetically couple with other magnetic fluxes.

It is only required that the four MOS transistors Qa, Qb, Qc, and Qd be controlled so that the power line of the power supply circuit 31 and the ground are not short-circuited through the full-bridge circuit 43a during a standby state. The optimum control pattern in this case can be obtained in advance through experiments or the like.

In this configuration, the power supply voltage Vdd to the adjacent primary coil L1 is blocked when the primary side metal detection coil La is oscillating to detect a metal piece M during a standby state. Accordingly, the generation of a regenerative current through the series circuit of the primary coil L1 and the resonance capacitor C is suppressed. That is, magnetic coupling with the adjacent primary side metal detection coil La that is oscillating to detect a metal piece M is suppressed by blocking the power supply voltage Vdd to the primary coil L1.

As a result, the oscillation energy of the primary side metal detection coil La is not weakened by magnetic coupling.

Further, a situation in which the astable multivibrator 22a of the modulation wave signal generation circuit section 22 in the modulation circuit 20 of the appliance E cannot be driven does not occur. Accordingly, the detection accuracy of the metal piece M does not decrease.

Figure 15:
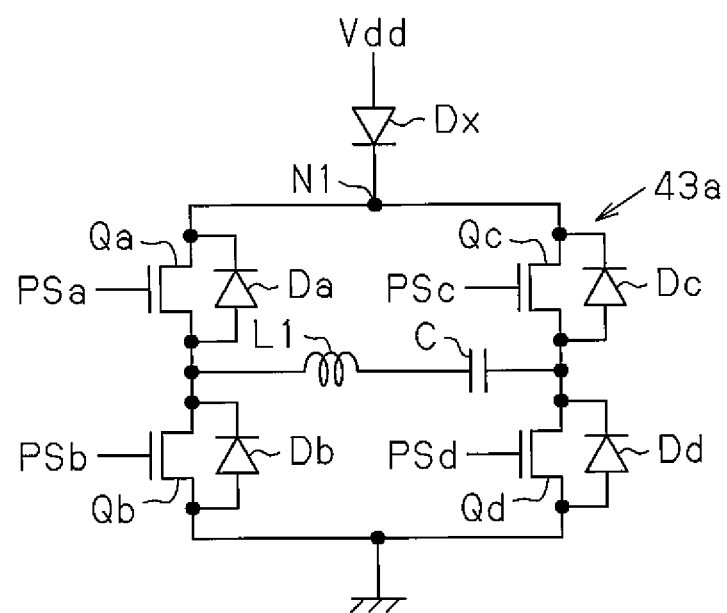
FIG. 15 is an electric circuit diagram of a full-bridge circuit in a further example.

The full-bridge circuit 43a may be configured as shown in FIG. 15. As shown in FIG. 15, a backflow prevention diode Dx is connected to a node N1 between the drain terminals of the two upper MPS transistors Qa and Qc. An anode terminal of the backflow prevention diode Dx is connected to the power line of the power supply circuit 31. A cathode terminal of the backflow prevention diode Dx is connected to the node N1. Therefore, the DC voltage Vdd is applied to the full-bridge circuit 43a via the backflow prevention diode Dx.

Flywheel diodes Da, Db, Dc, and Dd are connected in parallel to the MOS transistors Qa, Qb, Qc, and Qd, respectively. Even if the diodes Da, Db, Dc, and Dd are omitted, substantially equivalent MOS transistors Qa, Qb, Qc, and Qd can be obtained as long as they have body diodes.

In the full-bridge circuit 43a configured as described above, the two upper MOS transistors Qa and Qc are turned OFF and the two lower MOS transistors Qb and Qd are turned ON. This blocks the power supply voltage Vdd to the primary coil L1 to suppress magnetic coupling with the adjacent primary side metal detection coil La that is oscillating to detect the metal piece M.

In addition, the backflow prevention diode Dx is connected between the full-bridge circuit 43a and the power line of the power supply circuit 31. Thus, even if the impedance decrease and the potential fall for one reason or another in the power line of the power supply circuit 31, the flow of current induced at the primary coil L1 by the magnetic coupling with the primary side metal detection coil La to the power line of the power supply circuit 31 is inhibited by the backflow prevention diode Dx. That is, the oscillation energy of the primary side metal detection coil La can be prevented from flowing as a current to the power line of the power supply circuit 31 through the primary coil L1.

As a result, the oscillation energy of the primary side metal detection coil La does not weaken, and the detection accuracy of the metal piece M does not decrease.

In the embodiment described above, the determination of whether or not a metal piece M is present is performed by comparing the duty DU, which is calculated by the duty calculation circuit 44c, and the reference duty DUk.

However, the ON time t1 (duty DU) of the ON/OFF signal MP may differ greatly between when a metal piece M is not set and when a metal piece M is set. For instance, the ON time t1 of the ON/OFF signal MP may be very short when a metal piece M is not set, and the ON time t1 of the ON/OFF signal MP may be very long when a metal piece M is set.

In this case, instead of determining whether or not a metal piece M is present based on the duty DU of the demodulation signal DMP, the determination of whether or not a metal piece M is present may be performed based on a determination result of whether the ON (high level) period of the demodulation signal DMP is long or the OFF (low level) period is long. In the case of such a determination control, the duty DU does not need to be calculated. Thus, the determination of whether or not a metal piece M is present can be determined through a simple process.

In the embodiment described above, the modulation wave signal generation circuit section 22 of the modulation circuit 20 is configured by the astable multivibrator 22a but may be configured by a comparator. In this case, the comparator may compare the power supply voltage VG from the rectifier circuit 21 and the predefined voltage to generate the ON/OFF signal MP.

In the embodiment described above, the matching circuit MC of the modulation circuit 20 is configured by the resonance capacitor Cx but may have other circuit configurations. The rectifier circuit 21 of the modulation circuit 20 is configured by the half-wave rectifier circuit but may be configured by other rectifier circuits. Further, the modulation circuit section 23 of the modulation circuit 20 is configured by the transistor Q3 and the diode D1 but may have other circuit configurations.

In the embodiment described above, 24 power supplying areas AR are formed in the setting surface 3, but the number of power supplying areas AR is not limited to a specific number. In other words, the present invention is applicable to the power supplying device 1 including one or more power supplying areas AR.

Although the embodiments of the present invention have been described in detail, it should be understood that the various changes, substitutions, and alterations could be made hereto without departing from the spirit and scope of the invention.

The invention claimed is:

1. A contactless power supplying device that uses an electromagnetic induction effect to supply power to a power receiving device arranged in an electric appliance, the contactless power supplying device comprising:
   a primary coil arranged in each of one or more power supplying areas defined in a setting surface on which the electric appliance is set, wherein the primary coil supplies secondary power through electromagnetic induction to a secondary coil of the power receiving device in the corresponding power supplying area;
   a basic power supplying unit circuit arranged in each of the power supplying areas, wherein the basic power supplying unit circuit excites the primary coil in the corresponding power supplying area to supply secondary power through electromagnetic induction to the secondary coil, and the basic power supplying unit circuit transmits an oscillation signal from the corresponding power supplying area to the power receiving device, receives a modulated wave signal from the power receiving device that detects a modulation wave, which is in accordance with a magnetic flux change, from the oscillation signal, and detects the modulated wave signal to demodulate the modulation wave; and
   a system control unit that determines whether or not a metal foreign object is present in the power supplying area corresponding to the basic power supplying unit circuit based on the modulation wave demodulated by the basic power supplying unit circuit, wherein
   the basic power supplying unit circuit includes
   an oscillation circuit that transmits the oscillation signal to the power receiving device,
   a primary detection coil that receives the modulated wave signal,
   a detection circuit that detects the modulated wave signal received by the primary detection coil and demodulates the modulation wave, and
   a duty calculation circuit that calculates a duty of the modulation wave demodulated by the detection circuit; and
   the system control unit determines whether or not a metal foreign object is present in the power supplying area corresponding to the basic power supplying unit circuit based on the duty calculated by the duty calculation circuit and stops supplying power to the corresponding power supplying area when determining that a metal foreign object is present.

2. The contactless power supplying device according to claim 1, wherein:
the oscillation circuit is an excitation drive circuit that excites the primary coil; and
the primary detection coil is the primary coil.

3. The contactless power supplying device according to claim 1, wherein:
the power receiving device receives a carrier signal from the basic power supplying unit circuit with a secondary detection coil and generates the modulation wave as an ON/OFF signal having a duty that changes in accordance with a magnetic flux change at the secondary detection coil;
the modulated wave signal is generated by amplitude-modulating an amplitude of the carrier signal with the ON/OFF signal;
the detection circuit envelope-detects the modulated wave signal to demodulate the ON/OFF signal; and
the duty calculation circuit detects a duty of the ON/OFF signal demodulated by the detection circuit.

4. The contactless power supplying device according to claim 3, wherein the carrier signal is the oscillation signal transmitted from the oscillation circuit to the power receiving device.

5. The contactless power supplying device according to claim 1, wherein the basic power supplying unit circuit transmits the oscillation signal with a primary detection coil arranged independently from the primary coil that is used to supply the secondary power to the secondary coil.

6. The contactless power supplying device according to claim 5, wherein the primary detection coil is shared by adjacent ones of the power supplying areas.

7. The contactless power supplying device according to claim 1, wherein the basic power supplying unit circuit transmits the oscillation signal with the primary coil that is used to supply the secondary power to the secondary coil.

8. A contactless power supplying device that uses an electromagnetic induction effect to supply power to a power receiving device arranged in an electric appliance, the contactless power supplying device comprising:
a primary coil arranged in each of one or more power supplying areas defined in a setting surface on which the electric appliance is set, wherein the primary coil supplies secondary power through electromagnetic induction to a secondary coil of the power receiving device in the corresponding power supplying area;
a basic power supplying unit circuit arranged in each of the power supplying areas, wherein the basic power supplying unit circuit excites the primary coil in the corresponding power supplying area to supply secondary power through electromagnetic induction to the secondary coil, and the basic power supplying unit circuit transmits an oscillation signal from the corresponding power supplying area to the power receiving device, receives a modulated wave signal from the power receiving device that detects a modulation wave, which is in accordance with a magnetic flux change, from the oscillation signal, and detects the modulated wave signal to demodulate the modulation wave; and
a system control unit that determines whether or not a metal foreign object is present in the power supplying area corresponding to the basic power supplying unit circuit based on the modulation wave demodulated by the basic power supplying unit circuit, wherein:
the basic power supplying unit circuit includes
an oscillation circuit that transmits the oscillation signal to the power receiving device,
a primary detection coil that receives the modulated wave signal, and
a detection circuit that detects the modulated wave signal received by the primary detection coil and demodulates the modulation wave; and
the system control unit receives the modulation wave demodulated by the detection circuit, calculates a duty of the modulated wave, determines whether or not a metal foreign object is present in the power supplying area corresponding to the basic power supplying unit circuit based on the calculated duty, and stops supplying power to the corresponding power supplying area when determining that a metal foreign object is present.

9. The contactless power supplying device according to claim 8, wherein:
the oscillation circuit is an excitation drive circuit that excites the primary coil; and
the primary detection coil is the primary coil.

* * * * *